United States Patent
Li et al.

(10) Patent No.: US 8,913,651 B2
(45) Date of Patent: Dec. 16, 2014

(54) SYSTEM AND METHOD OF FREQUENCY OFFSET COMPENSATION FOR RADIO SYSTEM WITH FAST DOPPLER SHIFT

(75) Inventors: Jia-Ru Li, San Jose, CA (US); Meng-Chang Doong, Sunnyvale, CA (US)

(73) Assignee: Lilee Systems, Ltd., Santa Clara, CA (US)

(*) Notice: Subject to any disclaimer, the term of this patent is extended or adjusted under 35 U.S.C. 154(b) by 13 days.

(21) Appl. No.: 13/885,260

(22) PCT Filed: Oct. 28, 2011

(86) PCT No.: PCT/US2011/058399
§ 371 (c)(1),
(2), (4) Date: May 14, 2013

(87) PCT Pub. No.: WO2012/058600
PCT Pub. Date: May 3, 2012

(65) Prior Publication Data
US 2013/0287080 A1    Oct. 31, 2013

Related U.S. Application Data

(60) Provisional application No. 61/408,084, filed on Oct. 29, 2010.

(51) Int. Cl.
*H04B 3/46* (2006.01)
*H04W 24/02* (2009.01)
*H04L 27/00* (2006.01)

(52) U.S. Cl.
CPC ......... *H04W 24/02* (2013.01); *H04L 27/0014* (2013.01); *H04L 2027/0026* (2013.01); *H04L 2027/0065* (2013.01)

USPC .......... 375/224; 375/222; 375/223; 375/229; 375/295; 375/316

(58) Field of Classification Search
CPC ............ H04L 27/2675; H04L 27/2659; H04L 27/266; H04L 27/2662; H04L 1/06; H04L 2027/003; H04L 2027/0034; H04L 2027/0057; H04L 2027/0067; H04L 2027/0095; H04L 25/0212; H04L 27/2332; H04L 27/2649
USPC ......... 375/219, 220, 222, 223, 224, 229, 230, 375/259, 262, 272, 286, 295, 299, 306, 316, 375/320, 321, 342, 346
See application file for complete search history.

(56) References Cited

U.S. PATENT DOCUMENTS 7,602,834 B1 * 10/2009 Giallorenzi et al. .......... 375/130
8,098,740 B2 *  1/2012 Suh et al. ................. 375/240.27
(Continued)

*Primary Examiner* — Hirdepal Singh
(74) *Attorney, Agent, or Firm* — Blairtech Solution LLC

(57) ABSTRACT

A system and method of frequency offset compensation are disclosed for a wireless system between a fast moving radio terminal associated with a locomotive and a stationary radio terminal associated with a base station. The present invention utilizes advanced frequency offset prediction to quickly track Doppler Shift caused by a fast moving locomotive. In one embodiment according to the present invention, the frequency offset prediction is based on a first plurality of coarse frequency offsets, first-order derivatives of the first plurality of coarse frequency offsets, and second-order derivatives of the first plurality of coarse frequency offsets. In another embodiment according to the present invention, the frequency offset prediction is based on a plurality of previous frequency offsets according to a Doppler shift model.

28 Claims, 30 Drawing Sheets

(B)    (C)    (D)    (E)

(56) References Cited

U.S. PATENT DOCUMENTS

| | | | |
|---|---|---|---|
| 8,270,502 B2 * | 9/2012 | Lai | 375/260 |
| 2005/0025222 A1 * | 2/2005 | Underbrink et al. | 375/141 |
| 2010/0118990 A1 * | 5/2010 | Lee et al. | 375/260 |
| 2011/0216865 A1 * | 9/2011 | Qi et al. | 375/371 |
| 2011/0275326 A1 * | 11/2011 | Jayasimha et al. | 455/63.1 |
| 2013/0170590 A1 * | 7/2013 | Hyll et al. | 375/343 |
| 2013/0201972 A1 * | 8/2013 | Alexander et al. | 370/336 |

* cited by examiner

| Distance to Base Station (meter) | -7 | -6 | -5 | -4 | -3 | -2 | -1 | 0 | 1 | 2 | 3 | 4 | 5 | 6 | 7 |
|---|---|---|---|---|---|---|---|---|---|---|---|---|---|---|---|
| Θ (rad) | -0.40 | -0.46 | -0.54 | -0.64 | -0.79 | -0.98 | -1.25 | 1.57 | 1.25 | 0.98 | 0.79 | 0.64 | 0.54 | 0.46 | 0.40 |
| Θ (deg) | -23.20 | -26.57 | -30.96 | -36.87 | -45.00 | -56.31 | -71.57 | 90.00 | 71.57 | 56.31 | 45.00 | 36.87 | 30.96 | 26.57 | 23.20 |
| Relative Speed Vr (m/s) | 127.66 | 124.23 | 119.10 | 111.11 | 98.21 | 77.04 | 43.92 | 0.00 | -43.92 | -77.04 | -98.21 | -111.11 | -119.10 | -124.23 | -127.66 |
| Doppler Shift (Hz) | 93.62 | 91.10 | 87.34 | 81.48 | 72.02 | 56.50 | 32.21 | 0.00 | -32.21 | -56.50 | -72.02 | -81.48 | -87.34 | -91.10 | -93.62 |
| Absolute Doppler Shift (Hz) | 93.62 | 91.10 | 87.34 | 81.48 | 72.02 | 56.50 | 32.21 | 0.00 | 32.21 | 56.50 | 72.02 | 81.48 | 87.34 | 91.10 | 93.62 |
| Doppler Freq. Change | -1.750 | -2.518 | -3.762 | -5.856 | -9.461 | -15.523 | -24.289 | -32.208 | -32.208 | -24.289 | -15.523 | -9.461 | -5.856 | -3.762 | -2.518 |
| Rate of Doppler Freq. Change | -0.492 | -0.767 | -1.244 | -2.094 | -3.606 | -6.062 | -8.766 | -7.919 | 0.000 | 7.920 | 8.766 | 6.062 | 3.606 | 2.094 | 1.244 |

*Fig. 2*

- A matrix of $[p^n_m]$ is formed, where
  - ▲ $n$ is the sliding window size, and
  - ▲ $m$ is number of bits in the packet

| Window | Acquisition | Tracking( m bit packet) |
|---|---|---|
| $T=1$ | $(p^1_0)$ | $(p^1_1) \sim (p^1_{m\,bits})$ |
| $T=2$ | $(p^2_0)$ | $(p^2_1) \sim (p^2_{m\,bits})$ |
| ... | | |
| ... | | |
| $T=n$ | $(p^n_0)$ | $(p^n_1) \sim (p^n_{m\,bits})$ |
| $T=n+1$ | $(p^{n+1}_0)$ | $(p^{n+1}_1) \sim (p^{n+1}_{m\,bits})$ |

- The problem can be formalized to find the value at $T=n+1$ for all $(p^{n+1}_0)$ and $(p^{n+1}_1) \sim (p^{n+1}_{m\,bits})$

*Fig. 4B*

- Let $K_0 = p_0^1 \ldots p_0^n$ $K_1 = \Delta K_0 / \Delta t$  first order differential, i.e. $K_1^n = p_0^n - p_0^{n-1}$ $K_2 = \Delta K_1 / \Delta t$  second order differential, i.e. $K_2^n = K_1^n - K_1^{n-1}$

- <u>Look Forward Predictor</u> will calculate ($p_0^{n+1}$) based on threshold of $\mu$, $\eta$, and $\delta$ and the coefficient $\alpha$, $\beta$, and $\gamma$.

- Algorithm:

(a) If $K_1^n > \mu$ (default $\mu = -28.8$) and $K_2^n < \eta$ (default $\eta = 0$)

$\hat{p}_0^{n+1} = K_0^n + K_1^n * \alpha 1 + K_2^n * \alpha 2$, where $\alpha 1 = 1$ and $\alpha 2 = 1.2$ (b) If $K_1^n <= \mu$ (default $\mu = -28.8$) and $K_2^n < \delta$ (default $\delta = -3.9$)

$\hat{p}_0^{n+1} = K_0^n + K_1^n * \beta 1 + K_2^n * \beta 2$, where $\beta 1 = 1$ and $\beta 2 = 0$ (c) Else $\hat{p}_0^{n+1} = K_0^n + K_1^n * \gamma 1 + K_2^n * \gamma 2$, where $\gamma 1 = 0.8$ and $\gamma 2 = 0.4$

*Fig. 8A*

Bit Correction Correlator Operation

▲ The block "$m+2$ Shift register" is to maintain the frequency offset for all bits in the last known packet.

▲ Use the newly estimated $\hat{p}_0^{n+1}$ and stored $[p_m^n \ldots p_1^n][p_0^n]$ from the preamble to find the $\hat{p}_1^{n+1}$ in next instance.

▲ The block "$K0$ database" stores the pre-calculated value for the Doppler table of Fig. 3a.

▲ The objective is to search among all the points in "$K0$ database" to find the next $\hat{p}_1^{n+1}$ using the stored $m+2$ values in the shift register.

▲ When the frequency offset reaches maximum, the value in next entry, 907 or 908, of "$K0$ database" is selected as the $\hat{p}_1^{n+1}$.

*Fig. 9A*

- Use GPS to detect the speed and calculate the expected Doppler offset $GP^1{}_0 \ldots GP^n{}_0$ Since the GPS accuracy is about 3 ~ 10 meters, sliding window of 8 to remove transient is needed $$\overline{GPS} = (GP^n{}_0 + GP^{n-1}{}_0 + GP^{n-2}{}_0 + \ldots + GP^{n-7}{}_0) / 8$$

- Use carrier offset estimation circuit to estimate offset $(p^1{}_0) \ldots (p^n{}_0)$ to represent the estimated value
- Use a frequency differentiation to estimate offset, FD
- Estimate the frequency offset using a weighted sum of the above three estimated results:

$$\phi_0 = \overline{GPS} * \varepsilon_1 + FD * \varepsilon_2 + k^n{}_0 * \varepsilon_3.$$

PS: when $\varepsilon_1 = 0$, this degenerates the system to operate without GPS signal
$\varepsilon_2 = 0$, this degenerates the system to operate without frequency discrimination

*Fig. 10B*

SYSTEM AND METHOD OF FREQUENCY OFFSET COMPENSATION FOR RADIO SYSTEM WITH FAST DOPPLER SHIFT

CROSS REFERENCE TO RELATED APPLICATIONS

The present invention claims priority to U.S. Provisional Patent Application, No. 61/408,084, filed Oct. 29, 2010, entitled "System and Method for Signal Processing in Environment Subject to Fast Doppler Shift Change". The U.S. Provisional Patent Application is hereby incorporated by reference in its entireties.

FIELD OF THE INVENTION

The present invention relates to signal processing for communication systems. In particular, this invention relates to digital signal processing using adaptive equalization in environment subject to fast Doppler shift change.

BACKGROUND

In a wireless Positive Train Control (PTC) system, a fast-travelling locomotive communicates with a wayside or track-side base station through a radio link. A spectrum at 220 MHz has been allocated for the wireless PTC application, where orthogonal frequency division multiplexing (OFDM) is selected as the underlying modulation technology to provide a reliable communication link between a locomotive and base stations. It is well known for digital radio systems that there are various channel impairments due to noise, multipath propagation and the time-varying transmission media. Accordingly, channel equalization is often used to compensate channel impairments to improve system performance. For example, in U.S. Pat. Ser. No. 5/283,811, entitled "Decision Feedback Equalization for Digital Cellular Radio", by Sandeep Chennakeshu et al., issued on Feb. 1, 1994, discloses an adaptive Decision Feedback Equalizer (DFE) for a digital cellular mobile radio channel demodulator employing a Complex Fast-Kalman Adaptation algorithm to track channel variations.

When a train travels at a high speed, the relative speed between the on-board radio terminal at the locomotive and the base-station radio terminal at wayside or track-side will cause a phenomenon of frequency shift in the received signal, called the Doppler Effect. The Doppler Effect becomes more prominent for signal at higher frequencies. For example, the wireless PTC system with a VHF signal at 220 MHz will be subject to a Doppler frequency shift of 102.1 Hz when the locomotive travels at a speed of 500 km/h (138.89 m/s) relative to the base station. In a real environment, the signal received from the transmitter often travels through multiple paths to arrive at the receiver. The overall result of Doppler Effect and multi-path reception will cause fluctuations in the received signal associated with the Doppler frequency.

In practice, the base station is located in the proximity of the railroad track. When the locomotive passes by the base station, the Doppler frequency will rapidly change from a positive frequency offset to zero, and to a negative frequency offset. In the above example, the Doppler frequency will change from +101.8 Hz to −101.8 Hz in a very short period of time. If the system design does not take into account of fast changing Doppler frequency near the base station, the system may fail, such as loss of phase tracking. For example, if a slow frequency tracking loop is used, the frequency may have changed substantially before the tracking loop converges. On the other hand, if a fast tracking loop is always used, the performance of the equalizer may be compromised. Consequently, it is desirable to design a system that can adaptively select proper tracking speed according to variation of the channel condition.

BRIEF SUMMARY OF THE INVENTION

A method and system for compensating frequency variation associated with relative motion between a stationary radio terminal and a mobile radio terminal are disclosed. The method and system according to one embodiment of the present invention comprises: receiving a signal associated with a packet, wherein the packet comprises a preamble part and a payload part; determining a first estimated value of next coarse frequency offset based on a first plurality of coarse frequency offsets, first-order derivatives of the first plurality of coarse frequency offsets, and second-order derivatives of the first plurality of coarse frequency offsets; and compensating the signal associated with the packet according to the first estimated value. The coarse frequency offset can be measured based on received signal corresponding to the preamble part. Furthermore, the coarse frequency offset can be measured based on correlation of the received signal and a pre-defined signal. In one embodiment, said determining the first estimated value is based on a weighted sum of the first plurality of coarse frequency offsets, the first-order derivatives of the first plurality of coarse frequency offsets, and the second-order derivatives of the first plurality of coarse frequency offsets using weighting factors. In another embodiment according to the present invention, the method further comprises determining a second estimated value of next fine frequency offset based on a plurality of fine frequency offsets and a second plurality of coarse frequency offsets after said determining the first estimated value; and compensating the signal associated with the packet according to the second estimated value. Said compensating the signal associated with the packet according to the second estimated value is applied to the payload part. In yet another embodiment according to the present invention, the method further comprises determining a third estimated value of next frequency offset based on speed information of the mobile radio terminal, GPS information of the mobile radio terminal, frequency differentiation, or a combination of two or more members selected from a group consisting of the speed information of the mobile radio terminal, the GPS information of the mobile radio terminal, and the frequency differentiation; and compensating the signal associated with the packet according to the third estimated value. Said determining the third estimated value is based on a weighted sum of the speed information of the mobile radio terminal, the GPS information of the mobile radio terminal, and the frequency differentiation using weighting factors.

The method and system according to another embodiment of the present invention comprises: receiving a signal transmitted between the radio base station and the locomotive radio terminal; determining an estimated value of frequency offset based on a plurality of previous frequency offsets according to a Doppler shift model; and compensating the signal according to the estimated value. The Doppler shift model can be associated with Doppler frequency shift and relative speed between the radio base station and the locomotive radio terminal. Alternatively, the Doppler shift model can be associated with Doppler frequency shift and principal distance between the radio base station and the locomotive radio terminal for a given locomotive speed. Said determining the estimated value can be based on matching the plurality of previous frequency offsets with the Doppler shift model and wherein shift registers can be used to store the plurality of previous frequency offsets.

BRIEF DESCRIPTION OF THE DRAWINGS

FIG. 2 illustrates various parameters including Doppler shift, absolute Doppler shift, Doppler frequency change and rate of Doppler frequency change for a moving locomotive at various locations near a track-side base station.

FIG. 4B shows problem formulation for the Doppler prediction according to one embodiment of the present invention.

FIG. 8A shows an exemplary look forward algorithm of Doppler frequency offset prediction for the next packet according to an embodiment of the present invention.

FIG. 9A illustrates an exemplary algorithm of per-bit frequency offset correction using correlator.

FIG. 10B illustrates an exemplary carrier offset estimation algorithm based on GPS method, $P^k_0$, and frequency discrimination.

DETAILED DESCRIPTION OF THE INVENTION

In digital communication systems, channel impairments such as noises, fading, and multi-path cause distortion in the received signals. Various signal processing techniques have been developed to improve the system performance. Equalization is one widely used technique to compensate the channel impairments so as to restore the received signal. An adaptive system is often utilized to allow the system to adjust equalizer parameters automatically according to selected criteria. The equalization may be configured as feed forward equalization (FFE) or decision feedback equalization (DFE), or a combination of both. It is well known that the adaptive equalization is very effective to restore the received signal subject to various channel impairment by cancelling noises and/or alleviate inter-symbol interference.

Adaptation algorithm is a method that updates the equalization parameters automatically. Adaptation algorithm has been well studied in the field and there are several widely used adaptation algorithms such Least Mean Square (LMS) algorithm and Recursive least squares (RLS) algorithm. The RLS algorithm usually achieves faster convergence. However, the computational complexity associated with RLS algorithm is higher than the LMS algorithm. The adaptation rate for an adaptive system has to be slow enough so as to reduce the impact by noise. On the other hand, the adaptation rate has to be fast enough to track the variation in channel characteristics. Therefore the adaptation rate usually is carefully selected to best match the underlying channel characteristics.

Figure 1:
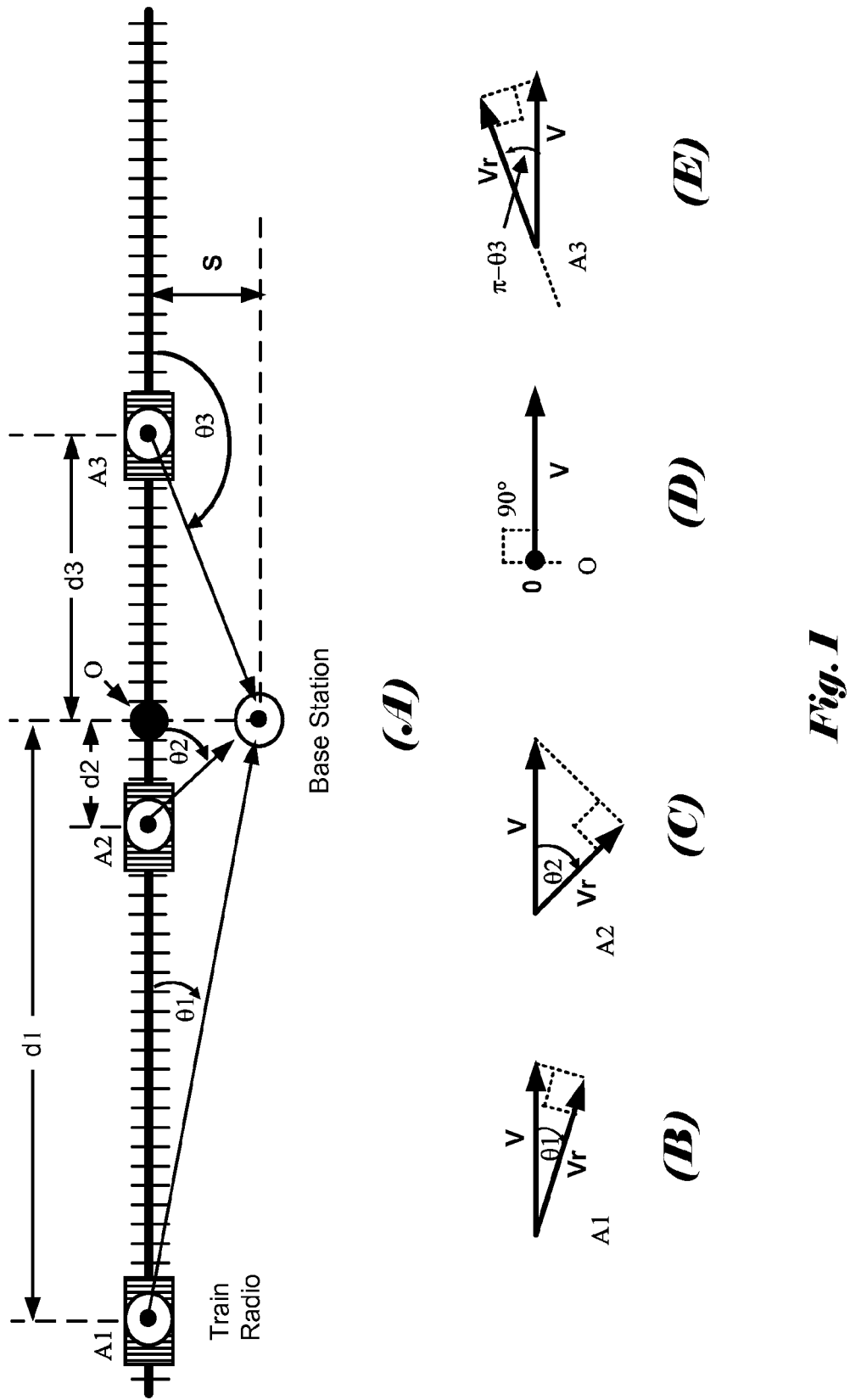
FIG. 1A illustrates a configuration of a moving locomotive and a track-side base station, where three different locomotive locations and the respective angle toward the base station are shown.
FIGS. 1B-E illustrate respective viewing angles at locations A1, A2, O and A3.

In the wireless Positive Train Control system, the particular radio system configuration poses a great challenge to the system design since the channel characteristics change rapidly when the locomotive passes by the wayside base station, also called track-side base station or base station. FIG. 1A illustrates system configuration with a train radio and a track-side radio. The locomotive is travelling at a speed V and is shown at three difference track locations: A1, A2 and A3. The track-side base station is located at a distance S from the track and the track location corresponding to the base station is marked as O in FIG. 1A. The distance between the locomotive and the base station is measured between the respective locomotive location and location O. For locations A1, A2 and A3, the respective distances are d1, d2 and d3 as shown in FIG. 1A. The respective distances d1, d2 and d3 are referred to as principal distances in this disclosure. The Doppler frequency shift, also called Doppler shift in brief, is related to the relative velocity between a radio transmitter and a radio receiver. When the locomotive is far away from the base station, the angle between the line linking the locomotive and the base station and the line coincided with the railroad track is very small. The relative speed in the direction from the locomotive to the base station is almost the same as the train speed. However, the relative speed in the direction between the locomotive and the base station become very different from the train speed when the locomotive approaches the base station. For easy reference, the angle between the line linking the locomotive and the base station and the line coincided with the railroad track is referred to as Viewing Angle, and the relative speed in the direction from the locomotive to the base station is referred to as relative LOS (Line of Sight) speed.

FIGS. 1B-E illustrate the viewing angles for locations A1, A2, O and A3 respectively. Also, the relative LOS speed is labeled as Vr and Vr=V·cos θ. The viewing angle increases when the locomotive approaches the base station. The viewing angle becomes 90° when the locomotive passes the location O. After the locomotive passes the location O, the viewing angle measurement is shown in FIG. 1E. According to FIGS. 1B-E, the relative LOS speed decreases when the locomotive approaches the base station and increases after the locomotive passes the location O. At the location O, the relative LOS speed becomes zero.

Figure 3A:
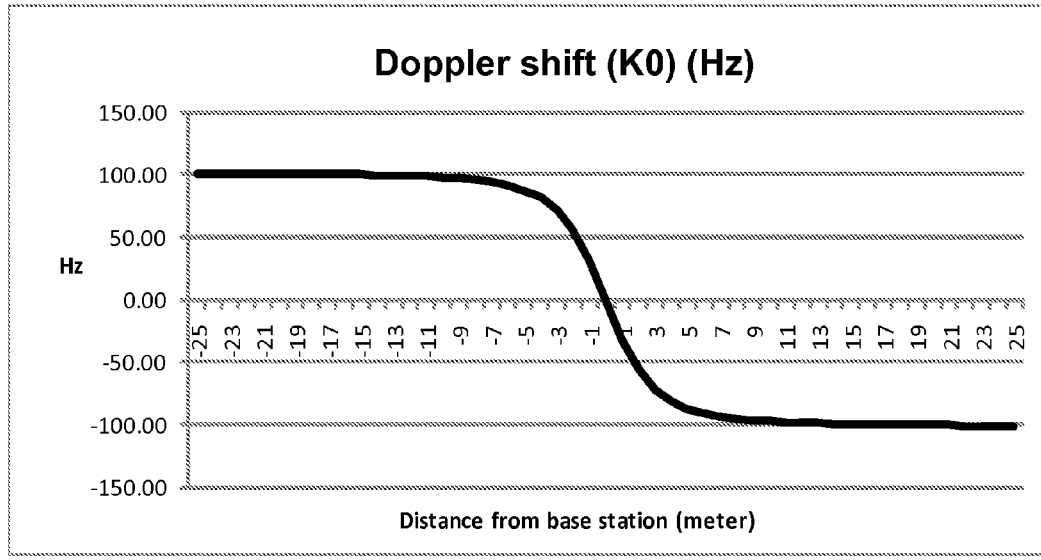
FIG. 3A illustrates a plot of Doppler shift verses distance from a locomotive to a base station.
Figure 3B:
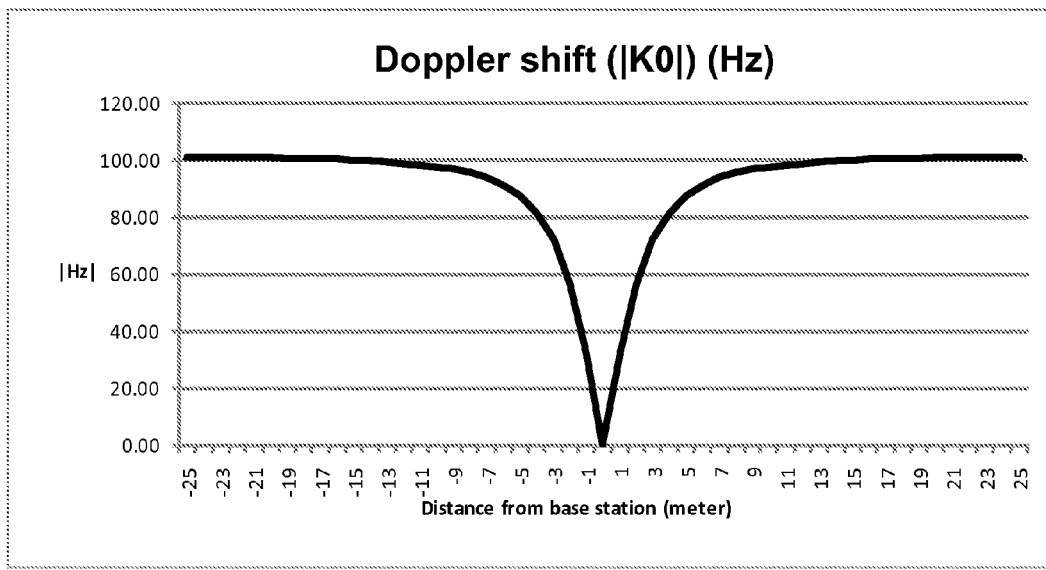
FIG. 3B illustrates a plot of absolute value of Doppler shift verses distance from a locomotive to a base station.
Figure 3C:
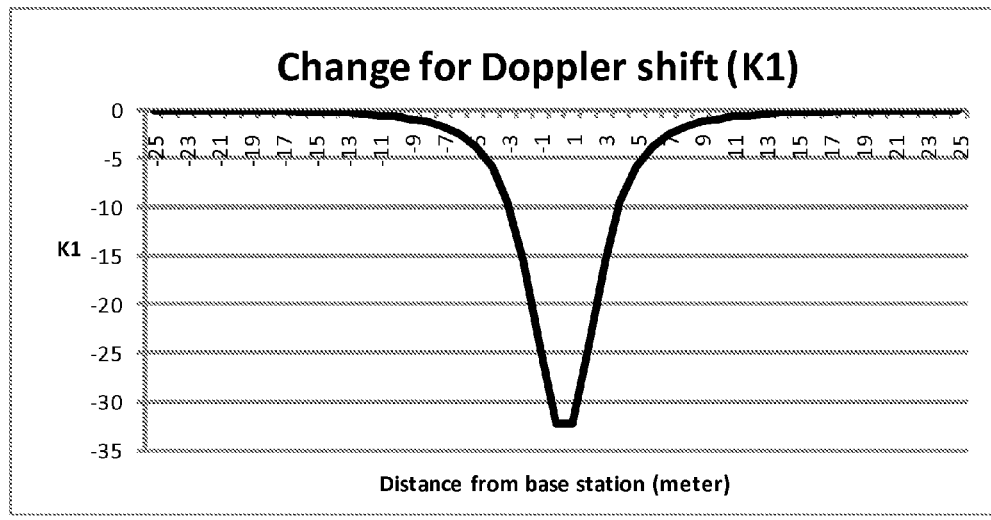
FIG. 3C illustrates a plot of change for Doppler shift verses distance from a locomotive to a base station.
Figure 3D:
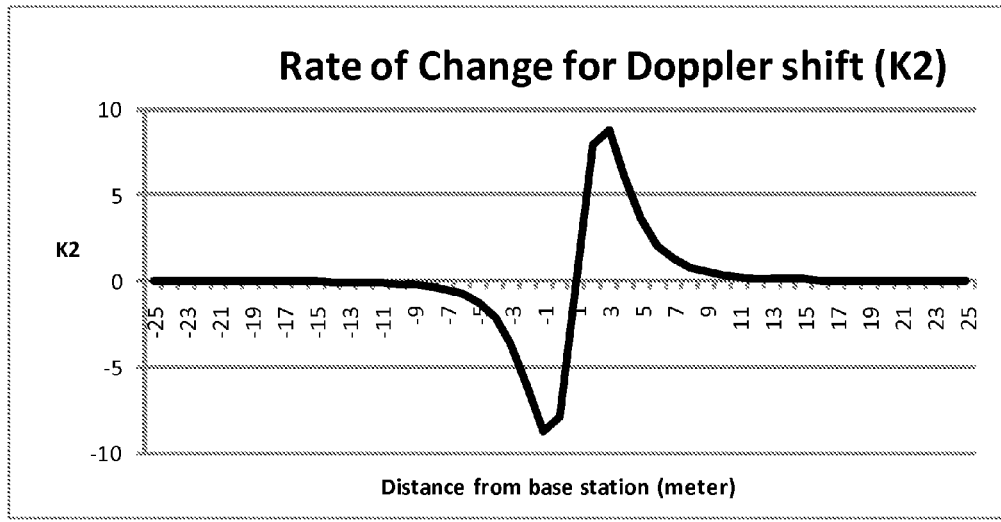
FIG. 3D illustrates a plot of rate of change for Doppler shift verses distance from a locomotive to a base station.

FIG. 2 illustrates variations of viewing angle and relative LOS speed. The viewing angles for locomotive-to-base station distances from −7 m (meters) to +7 m are shown, where the viewing angle θ measure in radian as well as in degree. For illustration purpose, the train speed is chosen to be 500 km/h and the frequency used by the wireless PTC system is 220 MHz. The relative LOS speed Vr is shown in the unit of meter per second (m/s) in FIG. 2. The Doppler shift $f_D$ is calculated according to $f_D = Vr \cdot f_O / C$, where $f_O$ is the radio frequency, i.e., 220 MHz in this example and C is the light speed, i.e., $3 \cdot 10^8$ m/s. The train speed of 500 km/h translates into 138.89 m/s. The Doppler shift and absolute Doppler shift for distances from −7 m to +7 m at 1 m step are shown in FIG. 2, where the magnitude of Doppler shift starts from 93.62°, drops to 0°, and comes back to 93.62°. The Doppler frequency change and the rate of Doppler frequency change for two consecutive locations at 1 m apart are also shown in FIG. 2. It is noted that the Doppler frequency change reaches a peak when the locomotive passes location O, which is 32.208 Hz for each meter travelled by the locomotive. The rate of Doppler frequency change reaches a negative peak when the locomotive passes location O and reverses its polarity after passing location O. FIGS. 3A and 3B illustrate the Doppler shift and the absolute Doppler shift for the above example. FIG. 3C and FIG. 3D illustrate the Doppler frequency change and the rate of Doppler frequency change for the above example. It is noted that the absolute Doppler shift, the Doppler frequency change and the rate of Doppler frequency change all provides very distinctive characteristics when the locomotive passes the base station.

Figure 4A:
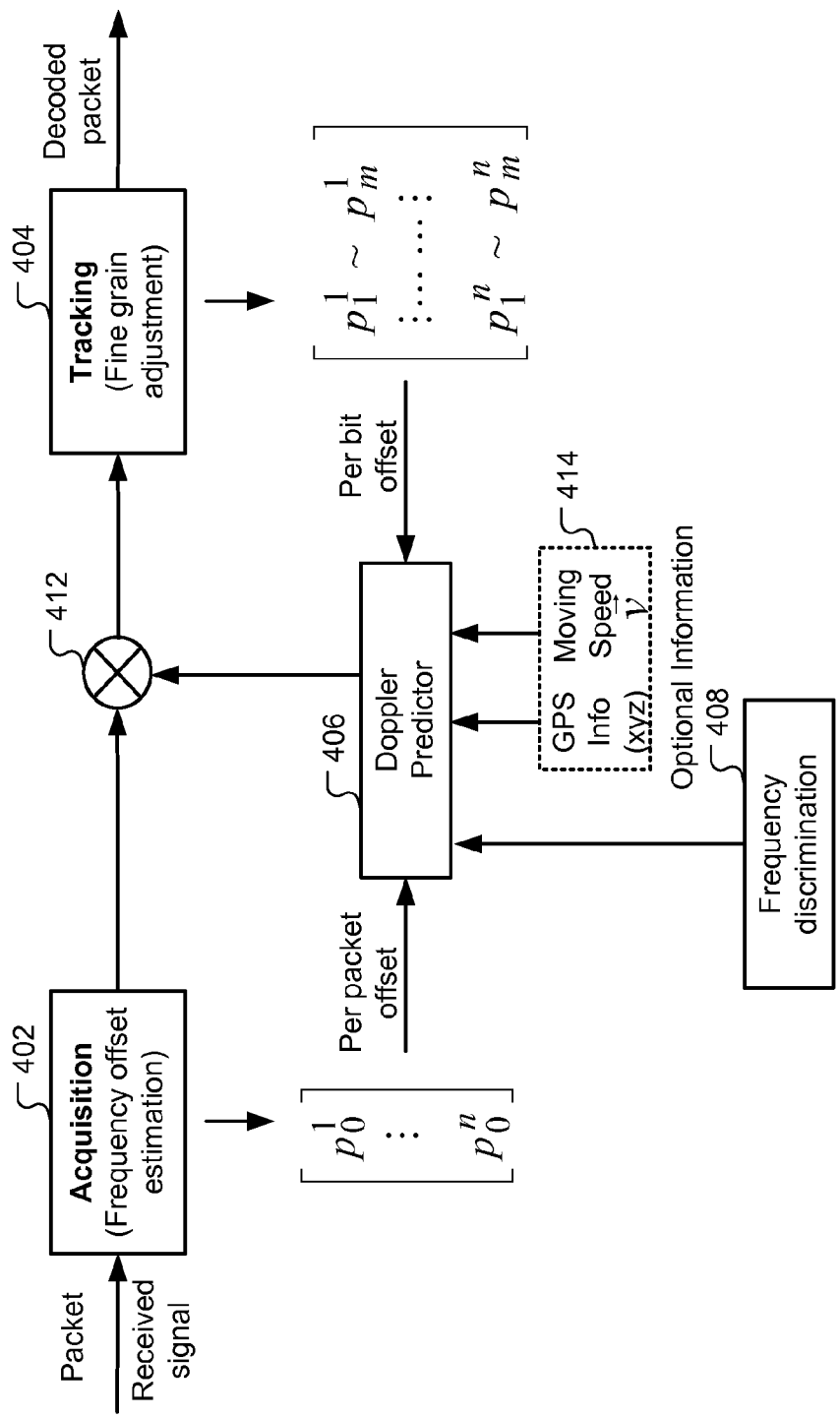
FIG. 4A illustrates an exemplary architecture of frequency offset compensation with Doppler prediction according to one embodiment of the present invention.

The digital communication system planned for the PTC uses packet structure where each packet comprises a preamble part and a payload part. The preamble part contains data that may be used for synchronization. In typical systems where the frequency offset does not change noticeable from packet to packet, the preamble part is used to estimate frequency offset and the estimated result is applied to the remaining part of the packet. However, the PTC system described is subject to rapid change in Doppler frequency offset. Therefore, significant change in frequency offset may occur within a packet. The conventional per-packet frequency offset compensation will fail. Accordingly, a new solution is required to overcome the problem associated with rapid change in frequency offset. The architecture of frequency offset compensation with Doppler prediction according to one embodiment of the present invention is shown in FIG. 4A. The center of the frequency offset compensation system is the Doppler predictor 406, which determines frequency offset based on multiple inputs. One input is the frequency offset estimated on a packet basis. The per packet based offset estimation is handled by the acquisition block 402 which estimates frequency offsets, $P_0^n = [p_0^1, \ldots, p_0^n]^t$ for n packets, where $p_0^n$ is the frequency offset estimation for packet n using the preamble part. The per-bit frequency offset is also considered to provide more dynamic frequency offset compensation. The tracking block 404 is used to compute the per-bit matrix $P_m^n$, $$P_m^n = \begin{bmatrix} p_1^1 \sim p_m^1 \\ \vdots \\ p_1^n \sim p_m^n \end{bmatrix}.$$

wherein $p_m^n$ is the frequency offset estimation for the mth bit in packet n. According to another embodiment of the present invention, the Doppler predictor also uses the frequency offset estimation based on frequency discrimination 408. In yet another embodiment, the Doppler predictor further uses the frequency offset estimation derived from GPS (Global Position System) information. FIG. 4B shows the problem formulation associated with the per-packet and per-bit based frequency offset estimation. The problem of Doppler prediction using per-packet and per-bit based frequency offset estimation is formulated as: determining $\hat{p}_0^{n+1}$ and $[\hat{p}_1^{n+1} \sim \hat{p}_m^{n+1}]$ based on $P_0^n$ and $P_m^n$, where $\hat{p}$ indicates an estimated or predicted value.

Figure 5A:
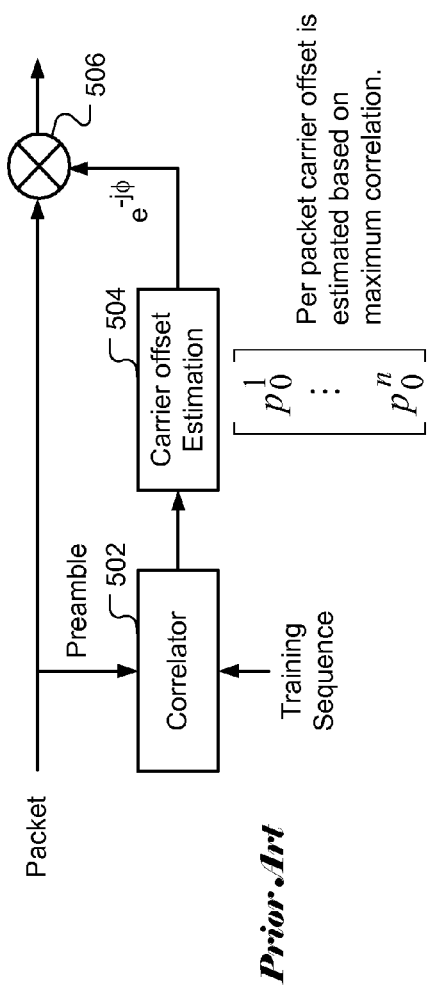
FIG. 5A illustrates frequency offset compensation according to prior art where the frequency compensation is updated on a per packet basis.
Figure 5B:
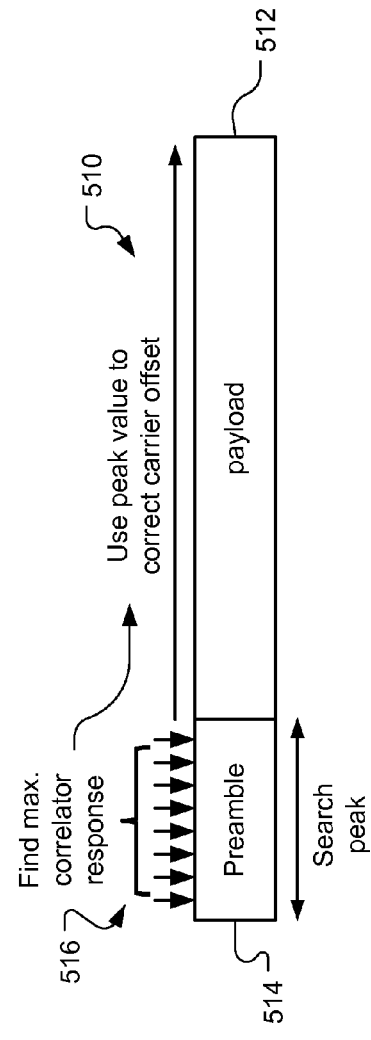
FIG. 5B illustrates a packet structure consisting of a preamble part and a payload part.
Figure 5C:
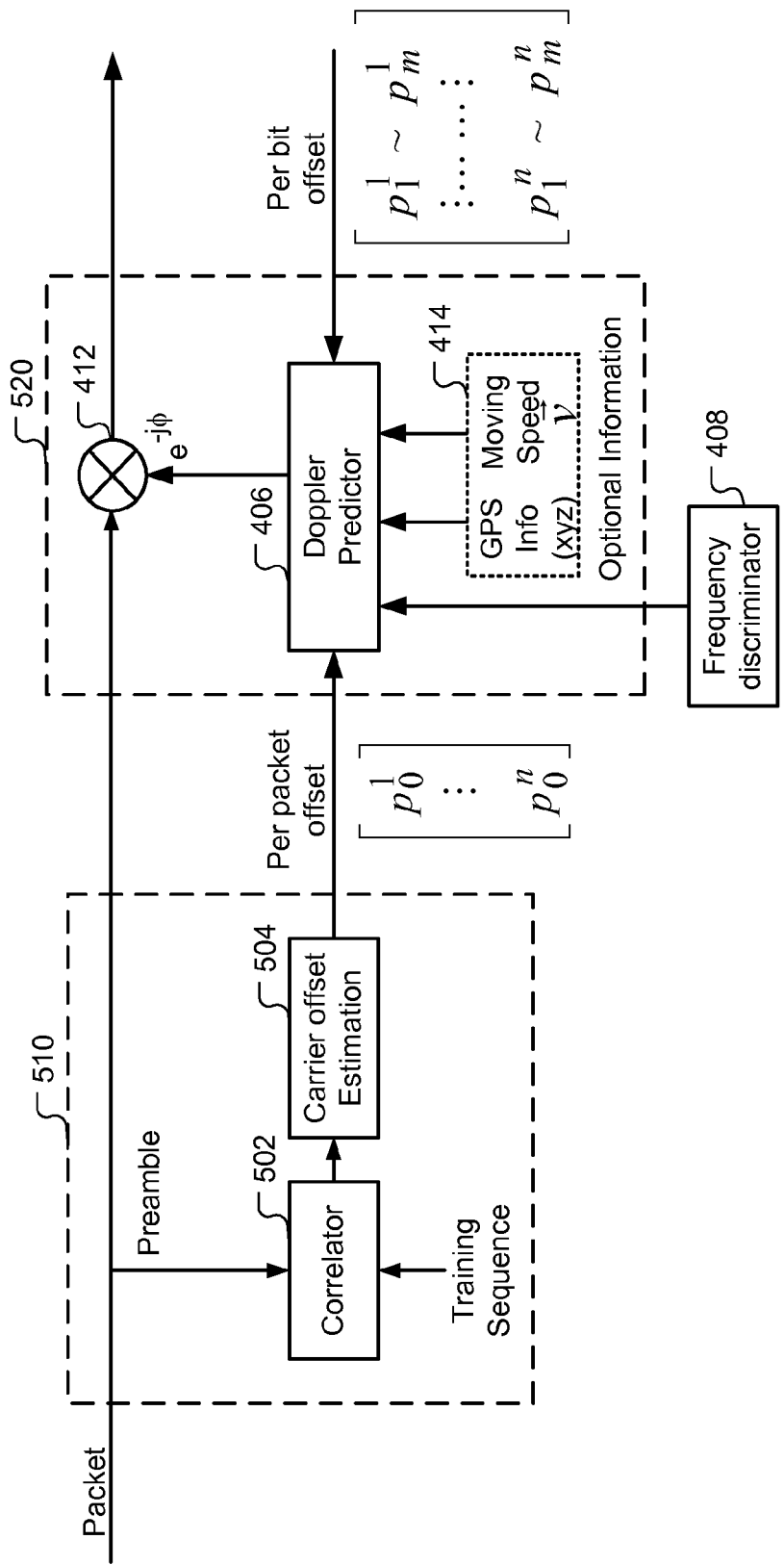
FIG. 5C illustrates an exemplary receiver having per-packet and per-bit based frequency offset compensation according to one embodiment of the present invention.

FIG. 5A illustrates frequency offset compensation according to prior art where the frequency compensation is updated on a per packet basis. The preamble part of the packet is processed by correlator 502 where the correlation function between the preamble part and a known training sequence is performed. Usually there is a bit pattern in the preamble part that has the characteristic of a distinct peak in the correlation function. The location of the peak is used to determine the correct location of the know bit pattern in the preamble and consequently determines the packet structure from the received bit stream. Based on the acquired bit pattern in the preamble part of each packet, the per-packet frequency offset is determined by block 504 and is used to compensate the frequency offset for the data in the packet using block 506. Such technique may be sufficient for a communication system operated in a typical environment where there is little relative motion or no motion between a transmitter and a receiver. Nevertheless, it will fail in the PTC system where the relative motion between the locomotive and the base station is substantial and the carrier frequency is high. Due to the rapid large Doppler frequency shift when the locomotive passes the base station, the perceived carrier frequency of the (n+1)th packet may be very different from the measured carrier frequency of the n-th packet. If the system uses an initial carrier frequency measured from a previous packet, the system may not be able to acquire the signal and cause system failure. According to one embodiment of the present invention, the system applies an estimated frequency offset based on previously measure frequency offsets so that the system will be able to follow the perceived carrier frequency quickly. FIG. 5B illustrates a packet structure consisting of a preamble part 514 and a payload part 512. The arrows 516 indicate the correlation at each bit location of the preamble and the maximum value is used to determine the correct identification of the bit pattern in the preamble. In a stationary communication system, the carrier offset is usually small and slow, therefore an initial carrier frequency from the previous packet may be sufficiently used to acquire the preamble signal and perform correlation to identify the new frequency offset. Furthermore, in the conventional approach, the frequency offset determined for the preamble part is assumed to stay the same for the payload part of the packet. However, in the fast Doppler shift environment considered here, the frequency offset during the payload period may still experience sizeable frequency offset. Therefore, it is desirable to dynamically update the frequency offset during the payload period as shown in FIG. 5C, where the circuits in the dashed box 520 corresponds to frequency offset compensation with Doppler prediction in FIG. 4A.

Figure 6A:
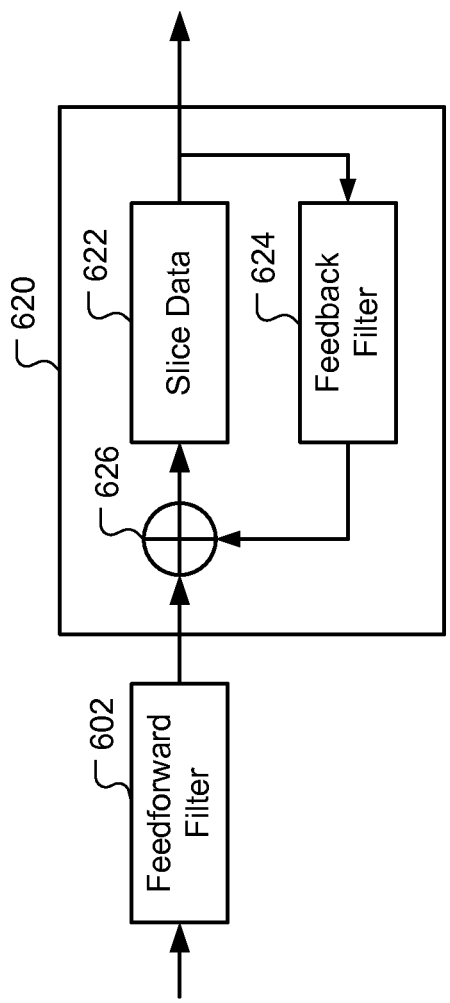
FIG. 6A illustrates a simplified system having a feed forward equalizer and a feedback equalizer.
Figure 6B:
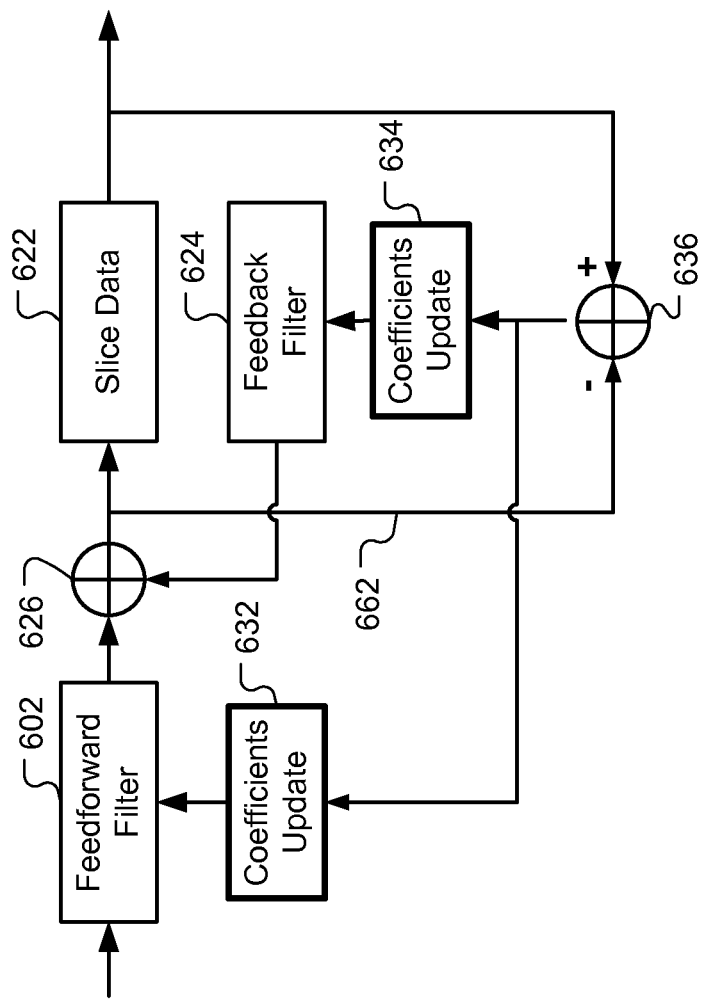
FIG. 6B illustrates a simplified adaptive system having a feed forward equalizer and a feedback equalizer with coefficient update.
Figure 6C:
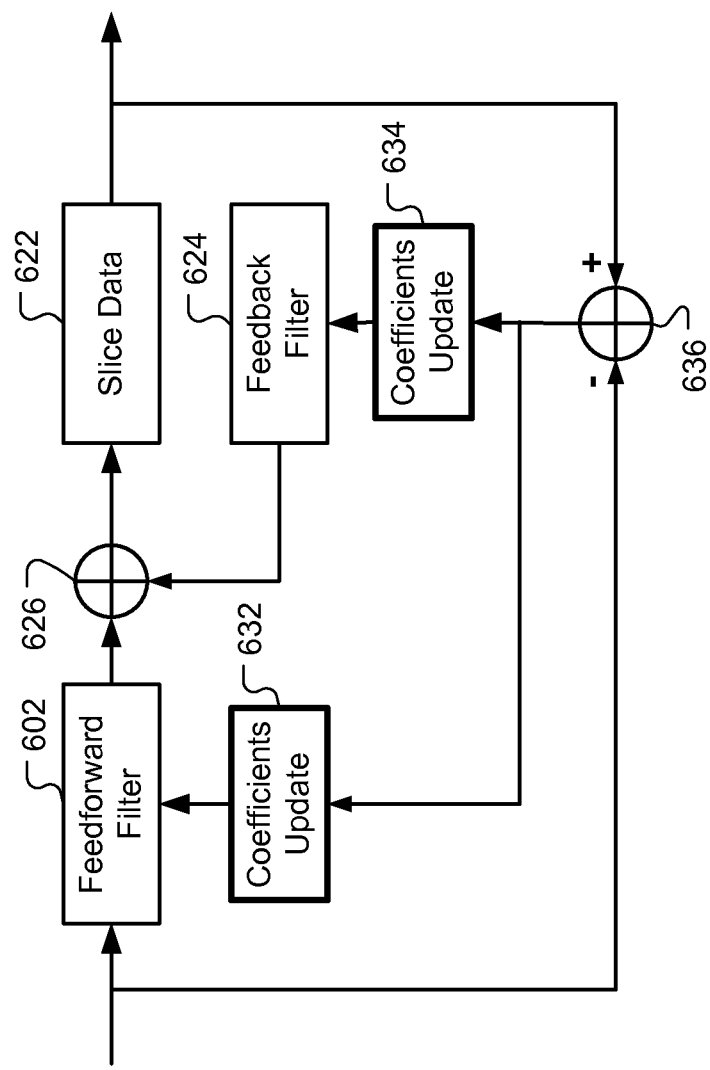
FIG. 6C illustrates an alternative adaptive system having a feed forward equalizer and a feedback equalizer with coefficient update.

As mentioned before, for an adaptive system design, the adaptation rate has to be properly designed to match the channel time-varying characteristics. For a fast time varying channel, the adaptation rate has to be faster to accommodate the fast changing channel characteristics. In adaptive system based on decision feedback equalization (DFE) and/or feed forward equalization (FFE), the filter coefficients are updated based on an error performance criterion. FIG. 6A shows a simplified communication receiver using a feed forward equalizer and a decision feedback equalizer. The feed forward equalizer 602 usually comprises a tapped delay line to generate a series of delayed signals and an FIR (Finite Impulse Response) filter applied to the series of delayed signals. The feed forward equalizer is intended to restore the pre-cursor distortion. The block 620 represents decision feedback equalizer which comprises a feedback equalizer 624, a data slicer 622, and an adder 626. The data slicer 622 is a decision making unit that generates output data. Similar to the FFE, the feedback equalizer may also be designed based on a delay line and FIR filter. In order to accommodate time varying channel condition, the filter parameters, also called filter coefficients, have to be modified to adapt to channel condition. FIG. 6B illustrates an adaptive system where the filter coefficients for the feed forward filter and the feedback filter are updated by respective update blocks 632 and 634. The control signal supplied to the coefficient update blocks 632 and 634 is based on an error signal generated by the error generation block 636. The error signal is generated from a reference signal and a recovered output signal. FIG. 6B illustrates an example of reference signal based on the conditioned signal 662 which is used as an input to the data slicer 622. Alternatively, the reference signal may also be based on the input signal 666 of the system as shown in FIG. 6C.

The adaptation algorithm is related to the error signal. For example, for the popular LMS algorithm, the strategy of adaptation is to minimize the LMS error. Let $P_i(n)$ be the ith coefficient at instance n and e(n) be the error signal. The LMS algorithm updates the coefficient according to:

$$p_i(n+1) = p_i(n) - k(e(n))\left[\frac{\partial e(n)}{\partial p_i}\right], \quad (1)$$

where k is the control parameter for the adaptation rate. A larger k will result in faster coefficient update which should be used for fast changing environment. On the other hand, a smaller k will result in slower coefficient update which should be used for slow changing environment.

As discussed previously, the channel condition will change rapidly when the locomotive passes by the base station. Therefore, the filter coefficients have to be updated quickly in order to accommodate the fast changing channel condition. Also, as is described previously, the absolute Doppler shift, the Doppler frequency change and the rate of Doppler frequency change all provide good indication of the fast changing channel condition. Particularly, the rate of Doppler frequency change as shown in FIG. 3D exhibits a sharp transition when the locomotive passes the base station. Therefore the rate of Doppler frequency change is especially useful for adaptation rate determination. Furthermore, the rate of Doppler frequency change exhibits a large negative peak immediately before passing the base station and a large positive peak immediately after passing the base station. The channel condition near the base station is substantially symmetric around the location O. Therefore, the coefficients derived for the instances before the base station can be applied to the instances after the base station. This will simplify the system design. Alternatively, the derived filter coefficients before the base station may be applied to instances after the base station as initial values for an iterative adaptation algorithm.

Figure 6D:
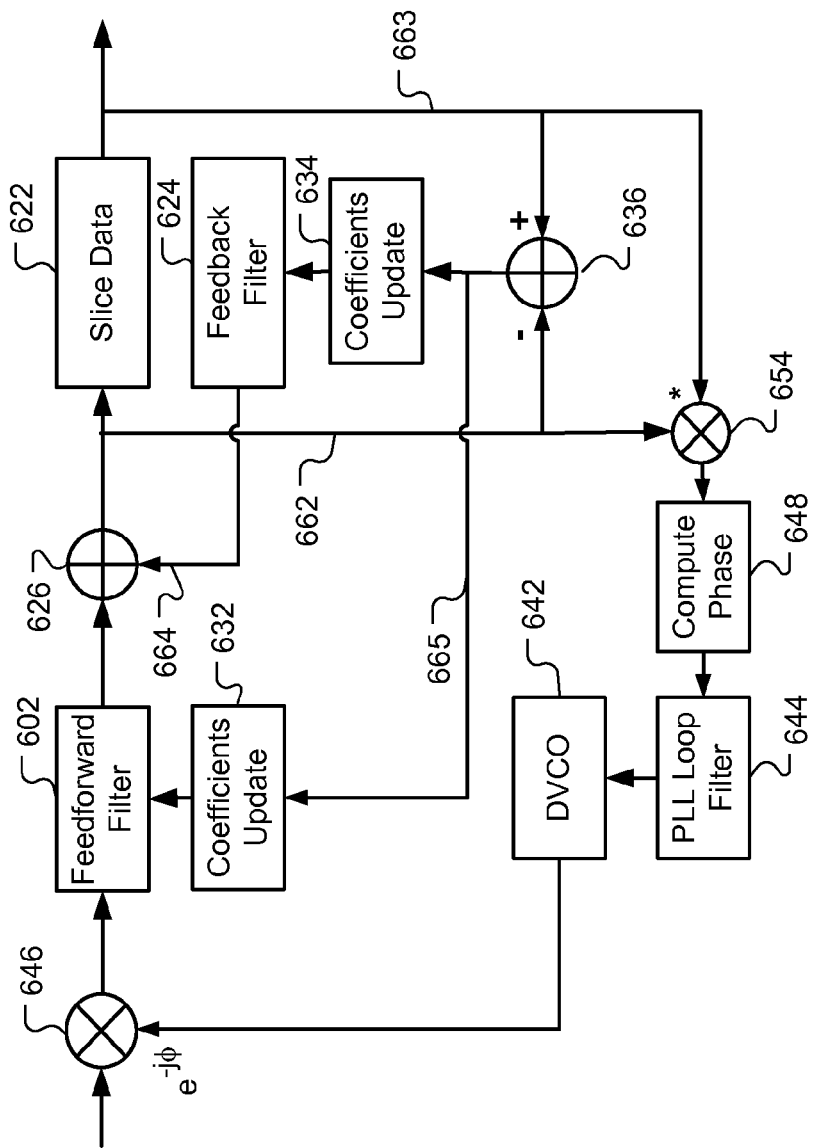
FIG. 6D illustrates an exemplary adaptive system having a feed forward equalizer and a feedback equalizer with coefficient update, where the system includes a PLL tracking loop.
Figure 6E:
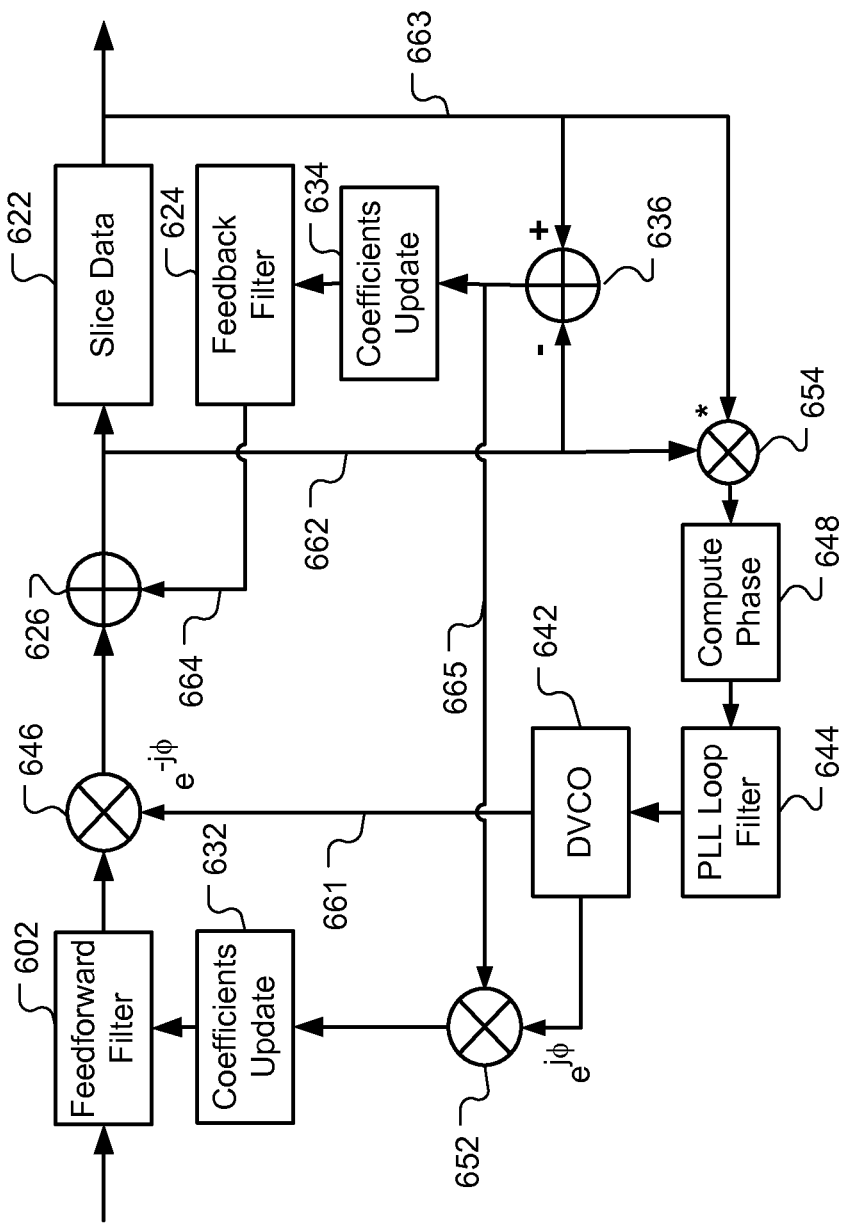
FIG. 6E illustrates an alternative adaptive system having a feed forward equalizer and a feedback equalizer with coefficient update, where the system includes a PLL tracking loop.

FIG. 6E illustrates an adaptive digital radio receiver having a phase tracking loop. Compared with the adaptive system of FIG. 6B, the system of FIG. 6E further comprises a phase tracking loop, wherein the phase tracking loop comprises a Phase-Locked Loop (PLL) filter 644, a digital voltage controlled oscillator (DVCO) 642 and compute phase block 648. The phase tracking loop receives its input from the multiplier 654. The multiplier 654 has its input from the output of data slicer 622 and the conditioned signal 662. The DVCO 642 provides estimated phase error $e^{j\Phi}$ to multiplier 646 to compensate phase error in the signal processed by feed forward equalization. In FIG. 4E, the DVCO 642 output is used to compensate the frequency offset after the signal is processed by the feedforward filter 602. However, the DVCO 642 output can also be used to compensate the frequency offset before the signal is processed by the feedforward filter 602 as shown in FIG. 6D. The phase error may be caused by Doppler shift. The phase error may also caused by the VCO frequency tolerance. In a typical system, the VCO may have a frequency tolerance between 20 to 100 ppm (part per million). The VCO frequency may fluctuate due to temperature variation which may inadvertently impact the Doppler shift estimation. In order to alleviate the impact of VCO frequency variation, a high accuracy VCO is utilized in the system.

Figure 7:
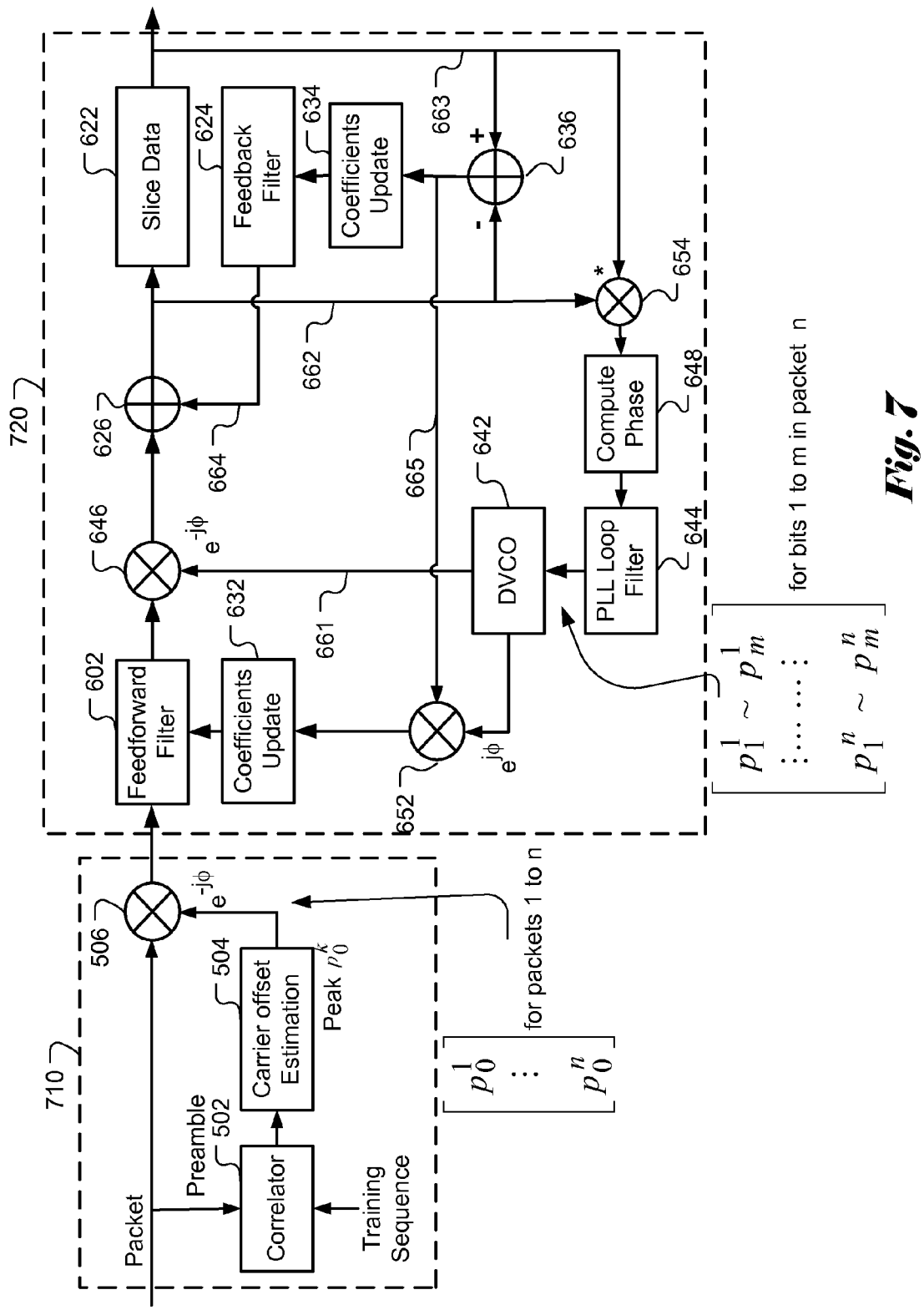
FIG. 7 illustrates an exemplary receiver having per packet and bit based frequency offset compensation according to one embodiment of the present invention.

FIG. 7 illustrates an exemplary receiver having per packet and bit based frequency offset compensation according to one embodiment of the present invention. The module 710 corresponds to the processing to compensate frequency offset before the feedforward filtering using per-packet based frequency offset estimation. The block 720 corresponds to the frequency offset compensation based on the per-bit based frequency offset estimation. It is noted that the module 720 adopts the receiver structure of FIG. 6E. The control signal to adjust the DVCO 642 is derived based on $P_m^n$.

Figure 8B:
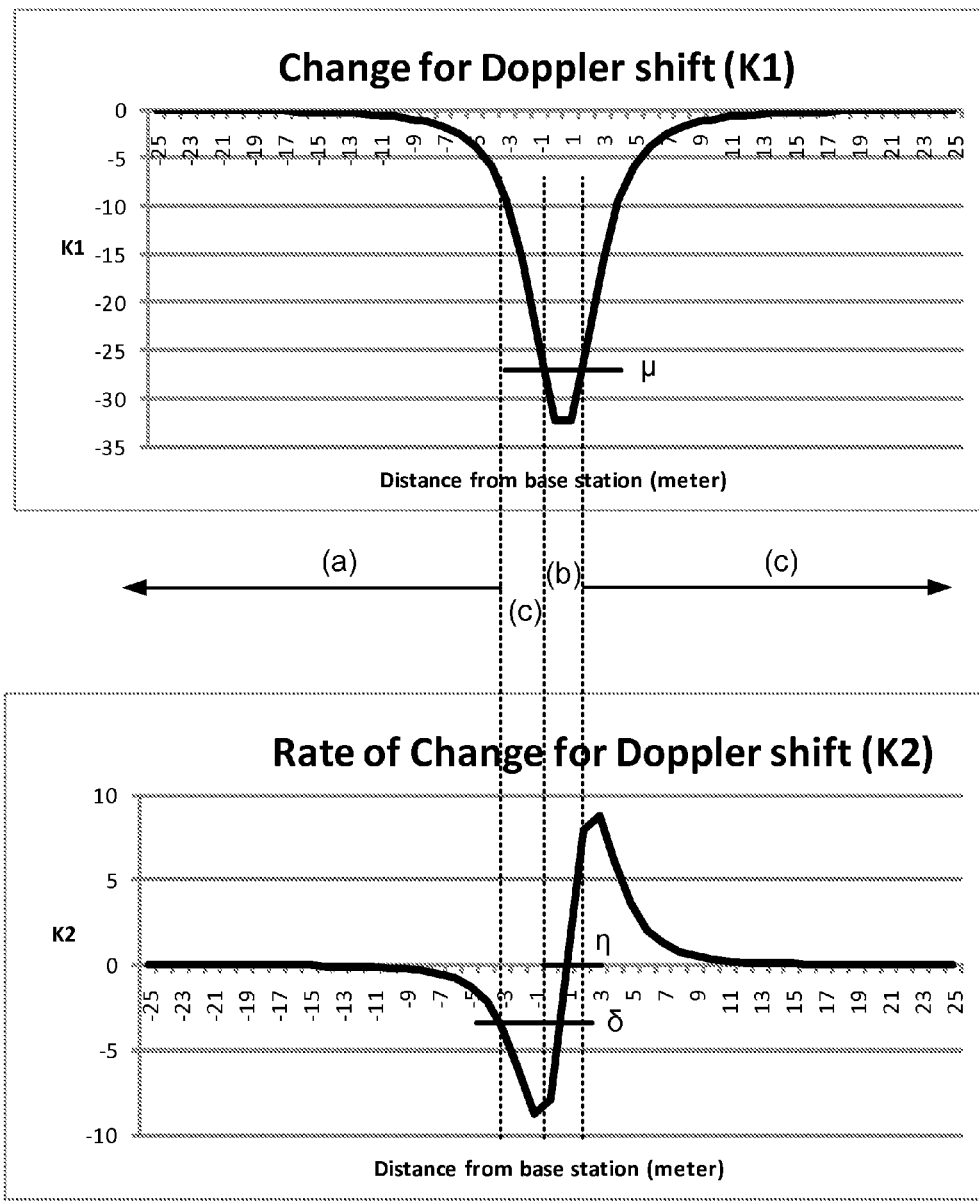
FIG. 8B illustrates exemplary ranges of $K''_1$ and $K''_2$ used for Doppler frequency offset prediction using different weighting factors.

FIG. 8A shows an exemplary look forward algorithm of Doppler frequency offset prediction for the next packet according to an embodiment of the present invention. The frequency offset $p_0^{n+1}$ for packet (n+1) is estimated based on $P_0^n$. As shown in FIG. 8A, $K_0^n$ represents the estimated frequency offset $p_0^n$, $K_1^n$ represent the first-order derivative of $K_0^n$ and $K_2^n$ represents the second-order derivative of $K_0^n$. The frequency offset $p_0^{n+1}$ for packet (n+1) is estimated based on a weighted sum of $K_0^n$, $K_1^n$ and $K_2^n$. Therefore, an initial frequency offset $\hat{p}_0^{n+1}$ according the offset prediction algorithm described in FIG. 8A is used for (n+1)-th packet. The measured frequency offset $p_0^{n+1}$ is derived according to the location of the maximum correlation between the received preamble and a predefined pattern. As shown in FIG. 8A, the coarse frequency offset estimation is adapted to the data range associated with $K_1^n$ and $K_2^n$. Three data ranges, (a), (b) and (c), are illustrates in the example of FIG. 8A. A corresponding set of weighting factors is associated with each range. The data ranges associated with $K_1^n$ and $K_2^n$ are illustrated in FIG. 8B. While the procedure described in FIG. 8A illustrates a particular linear combination having coefficients α, β, and γ, and threshold μ, η, and δ, other function may also be used. For example, a higher-order function may provide a more accurate estimation at a higher computational cost. Further, the numerical values shown in FIG. 8A are used for illustration purpose and these values shall not be construed as limitations to the present invention. A skilled person in the field may practice the present invention using other numerical values and equations without departing from the spirit of the present invention.

Figure 8C:
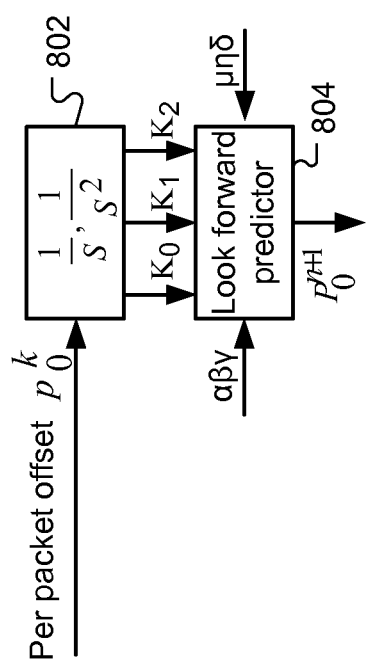
FIG. 8C illustrates an exemplary block diagram for implementing the look forward prediction algorithm in FIG. 8A.
Figure 8D:
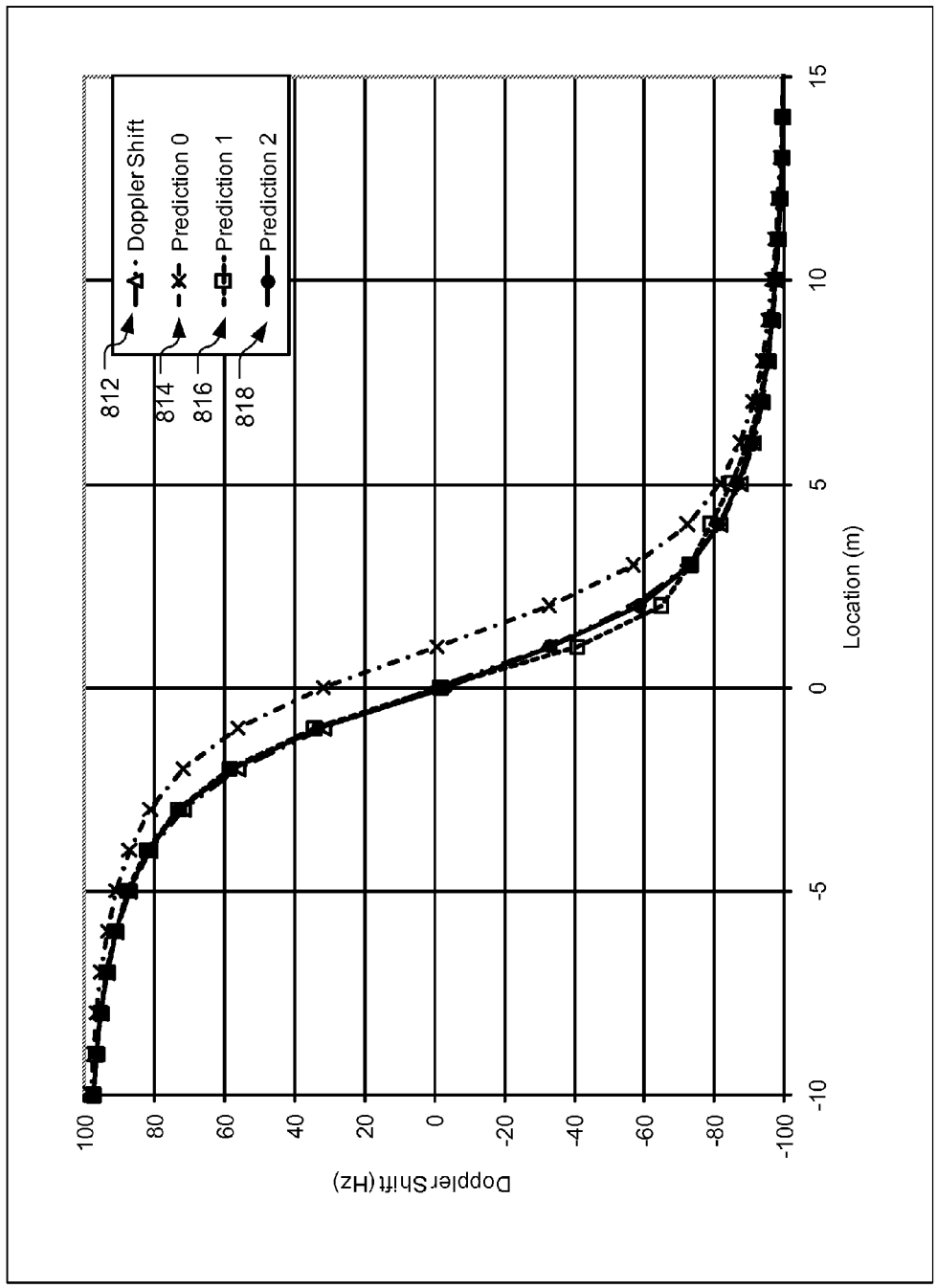
FIG. 8D illustrates performance for the look forward predictor where the predicted values are compared with the actual Doppler shift.

FIG. 8C illustrates an exemplary block diagram for implementing the look forward prediction algorithm in FIG. 8A. In block 802, 1/S and 1/S² represent the transfer functions corresponding to the first and second derivative operations respectively. The look forward predictor 804 corresponds to the estimation function based on $K_0^n$, $K_1^n$ and $K_2^n$. FIG. 8D illustrates performance for the look forward predictor where the predicted values are compared with the actual Doppler shift. In FIG. 8D, the curve associated with symbol 812 represents the actual Doppler shift at various locations around the base station. The curve associated with symbol 814 represents the estimated Doppler shift using Predictor-0=$K_0^n$, which corresponding to a conventional approach. The curve associated with symbol 816 represents the estimated Doppler shift using Predictor-1=$K_0^n + K_1^n + K_2^n$. The curve associated with symbol 818 represents the estimated Doppler shift using Predictor-2 which is the algorithm of FIG. 8A. It is clearly shown that the frequency offset prediction based on Predictor-3 matches the actual Doppler shift very well.

Figure 8E:
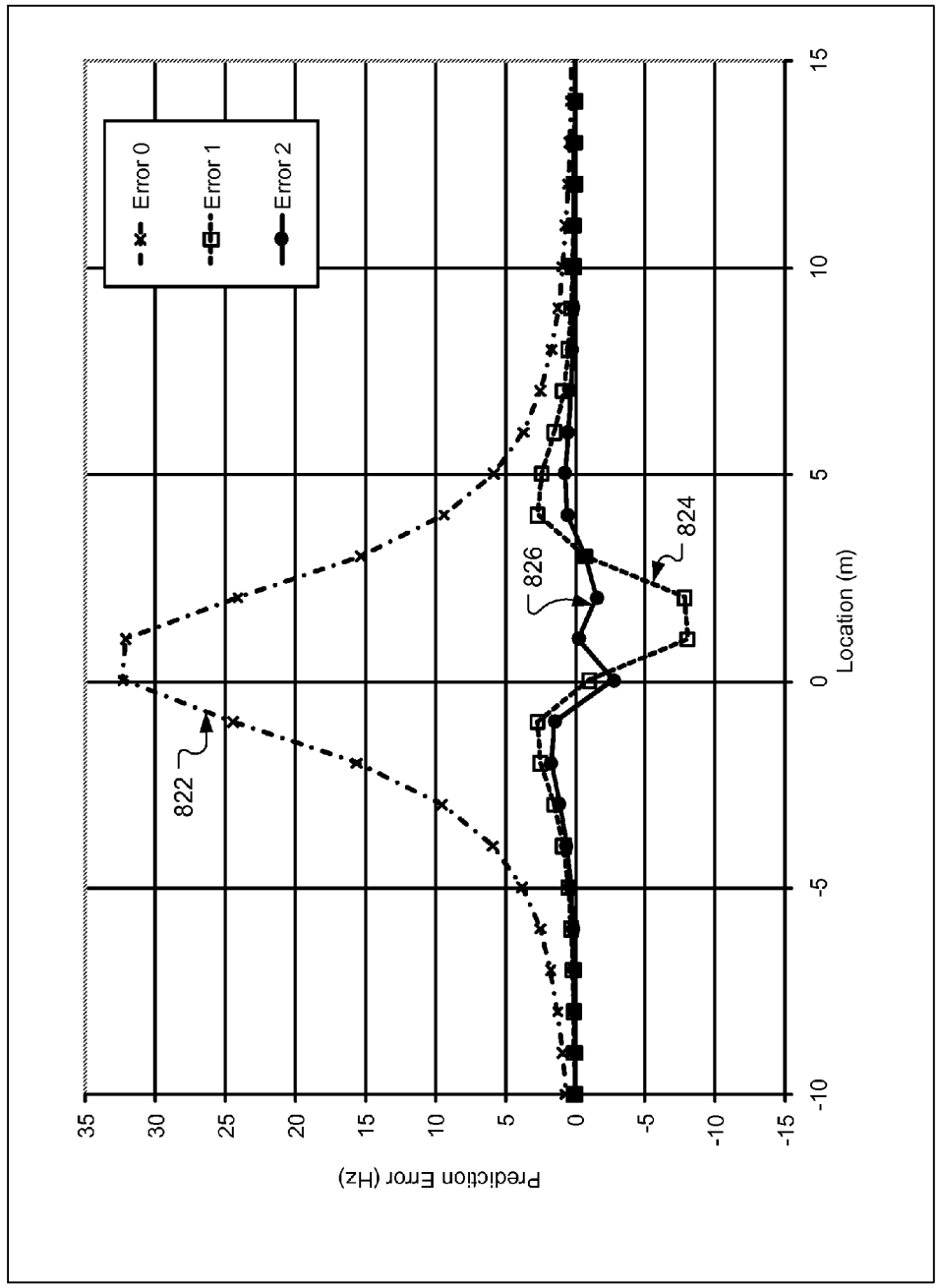
FIG. 8E illustrates exemplary performance for the look forward predictor where the differences between the predicted values and the actual Doppler shift are shown.

FIG. 8E illustrates performance for the look forward predictor where the differences between the predicted values and the actual Doppler shift are shown. The error curves associated with symbol 822, 824 and 826 represent the results for Predictor-0, predictor-1 and predictor-2 respectively. Again, it clearly shows that the result based on predictor-2 is much better than those for predictor-1 and predictor-0.

Figure 9B:
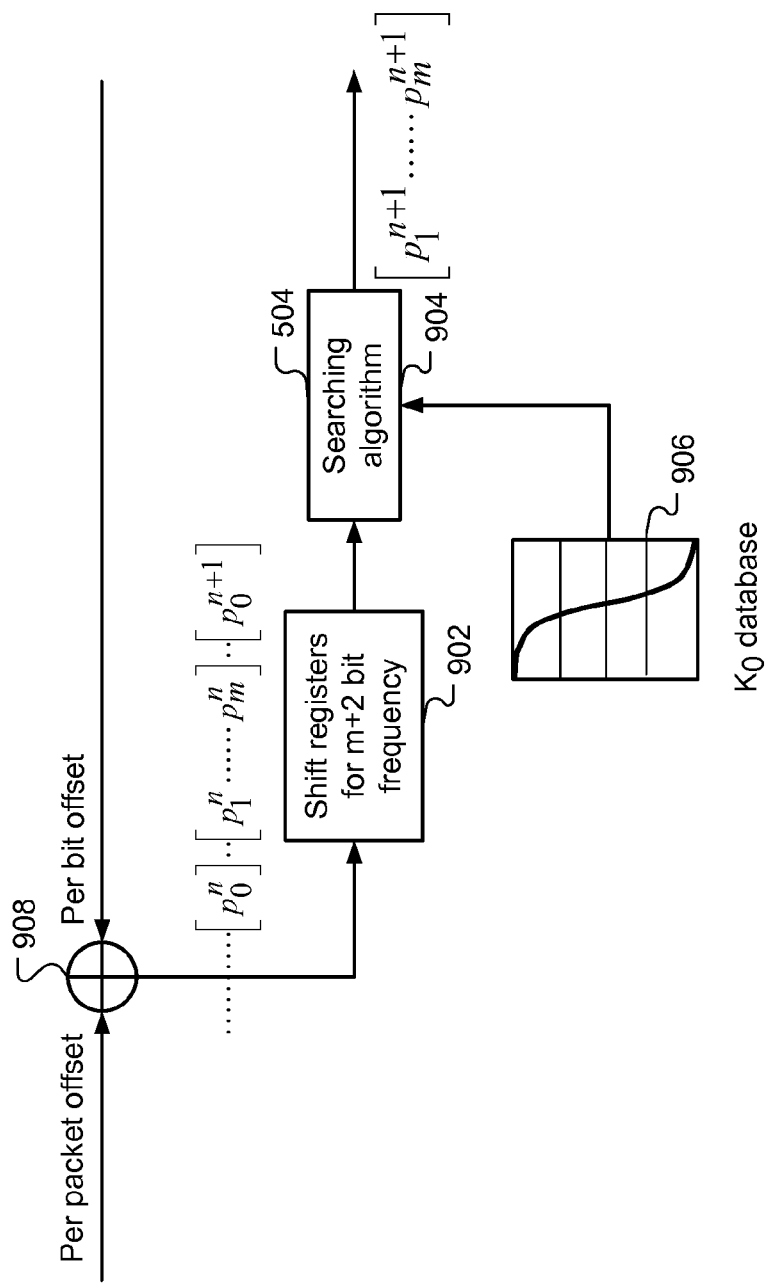
FIG. 9B illustrates an exemplary block diagram for implementing the per-bit frequency offset correction algorithm in FIG. 9A.
Figure 9C:
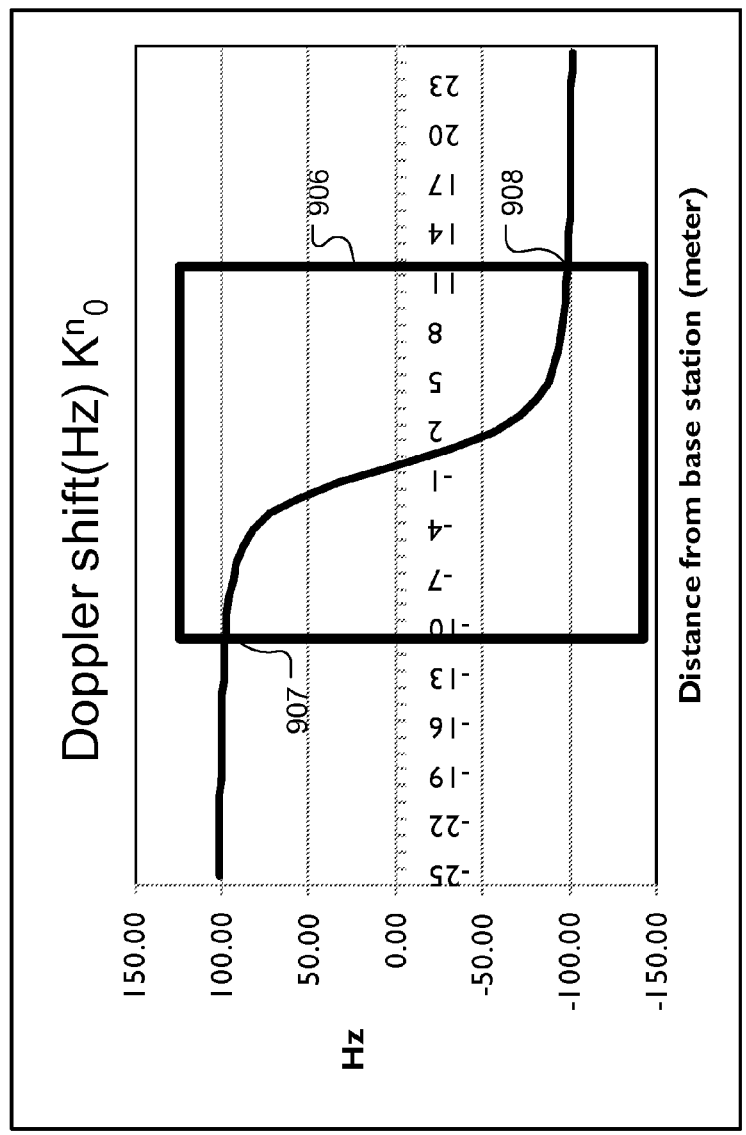
FIG. 9C illustrates an exemplary block diagram incorporating K0 database corresponding to Doppler shift of FIG. 3A.

FIG. 9A illustrates an algorithm of per-bit frequency offset correction using correlator. In the example, the per-packet frequency offset $p_0^n$ and the per-bit frequency offset $[p_m^n, \ldots, p_1^n]$ for the current packet, and the per-packet prediction $\hat{p}_0^{n+1}$ for the next packet are available for predicting the frequency offset $p_1^{n+1}$ of the first payload data bit in the next packet. As is observed in FIG. 3A, the Doppler shift changes rapidly and significantly around the base station. The Doppler shift profile near the base station can be used to predict the per-bit frequency offset. In this particular example, a register to store m+2 data corresponding to $p_0^{n+1}$, $[p_m^n, \ldots, p_1^n]$ and $p_0^n$ is used. Furthermore, a database corresponding to the actual Doppler shift of FIG. 3A around the base station is stored in the system where the same notation of $K_0$ is also used to designate the actual Doppler shift. By fitting the (m+2) samples corresponding to (m+2) frequency offset estimation already derived with the $K_0$ database, the frequency offset $p_1^{n+1}$ of the first payload data bit in the next packet can be predicted. FIG. 9B illustrates a block diagram for implementing the per-bit frequency offset correction algorithm in FIG. 9A. The (m+2) register 902 is used to store data corresponding to $p_0^{n+1}$, $[p_m^n, \ldots, p_1^n]$ and $p_0^n$. The searching algorithm block 904 is used to match the register data with the $K_0$ database supplied by block 906. An initial frequency offset $\hat{p}_1^{n+1}$ based on the above prediction procedure is used to derive a measured frequency offset $p_1^{n+1}$ for the first payload bit. The per-bit frequency offset $p_1^{n+1}$ for the first payload bit is shifted into the (m+2) shift register and the oldest entry, i.e. $p_0^n$, is shifted out of the (m+2) shift register. After the frequency offset for first payload is derived, the above prediction procedure is used to predict the frequency offset $\hat{p}_2^{n+1}$ for the second bit. The procedure will continue until the whole payload is processed. FIG. 9C illustrates the K0 database corresponding to Doppler shift of FIG. 3A near the base station.

Figure 10A:
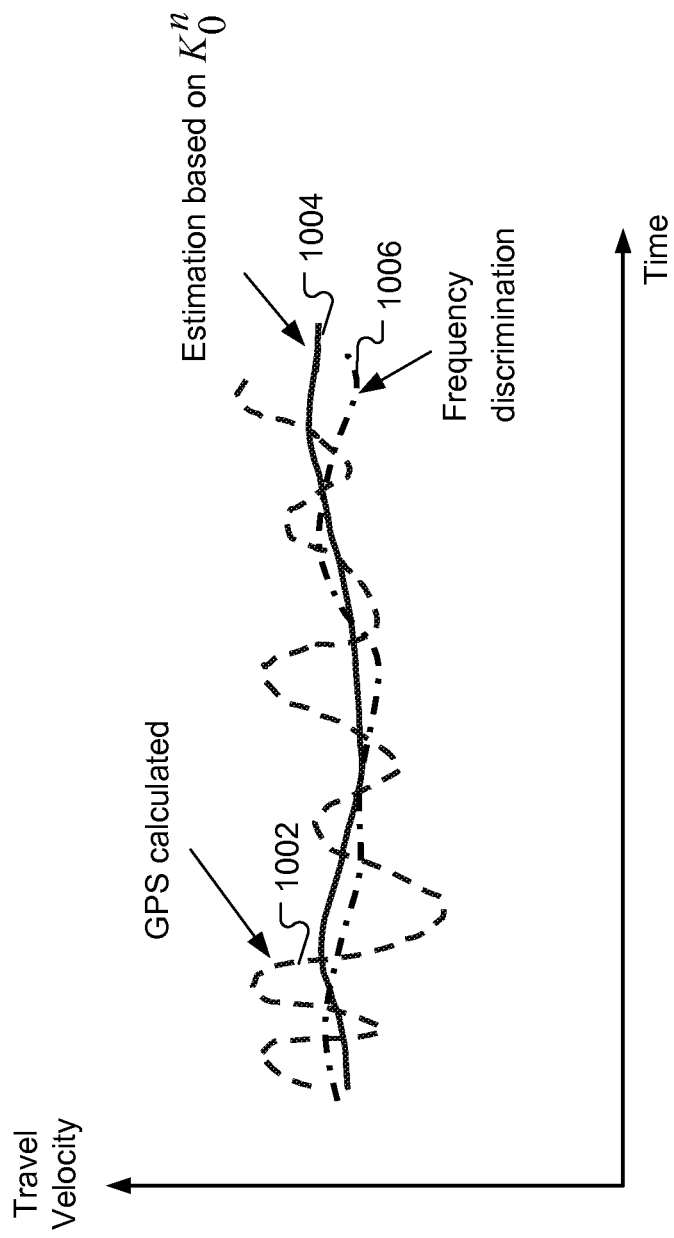
FIG. 10A illustrates exemplary carrier offset estimation results based on GPS method, $P^k_0$, and frequency discrimination.
Figure 10C:
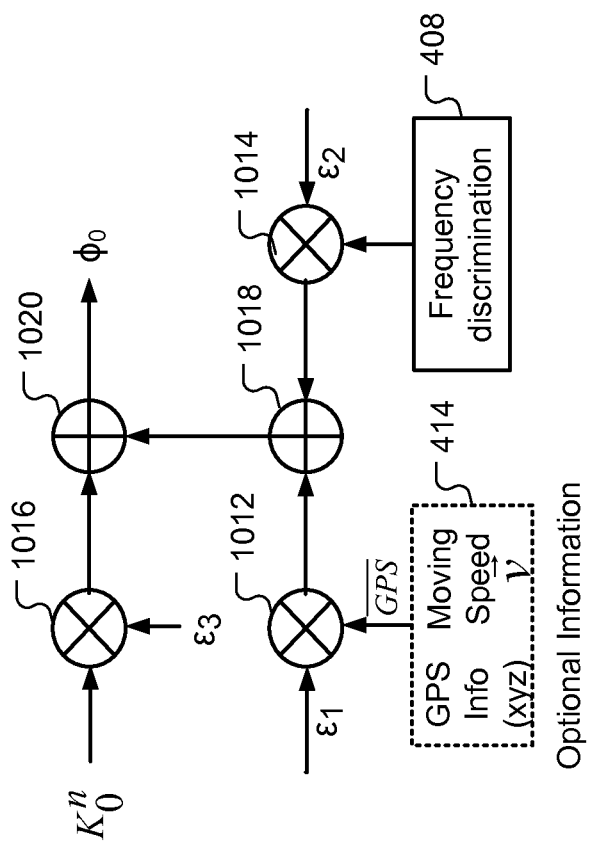
FIG. 10C illustrates an exemplary block diagram for implementing the carrier offset estimation algorithm in FIG. 10B.

Besides the method disclosed above based on the preamble bit pattern, the Doppler shift may also be estimated using other methods. For example, the GPS can provide an indication of locomotive location within a tolerance. The GPS locations can be associated with the time instances of GPS reading to provide estimate of travel speed which can be translated into Doppler frequency offset. Frequency discrimination can also be used to estimate the Doppler shift if an accurate local clock can be provided. FIG. 10A illustrates carrier offset estimation results based on GPS method 1002, $K_0$ 1004 and frequency discrimination 1006. FIG. 10B illustrates a carrier offset estimation algorithm based on GPS method, $K_0$, and frequency discrimination. Due to limited GPS accuracy, the GPS estimation is averaged over a sliding window of eight data. To improve the accuracy of Doppler shift estimate, a weighted sum of GPS-based, $K_0$-based and frequency discrimination based estimation can be used with weighting factors $\xi_1$, $\xi_2$ and $\xi_3$:

$$\Phi_0 = \xi_1 * \overline{GPS} + \xi_2 * FD + \xi_3 * K_0^n.$$

where $\xi_1=0$ implies that no GPS-based estimation is used and $\xi_2=0$ implies that no frequency discrimination based estimation is used. While FIG. 10B illustrates a linear weighting function to form the frequency offset estimation, any other function using the three parameters, $\overline{GPS}$, FD and $K_0^n$ can be used. FIG. 10C illustrates a block diagram for implementing the carrier offset estimation algorithm in FIG. 10B, where multipliers 1012, 1014 and 1016 are used to implement the weighting factors $\xi_1$, $\xi_2$ and $\xi_3$ respectively. The adders 1018 and 1020 combine the weighted results.

Figure 11A:
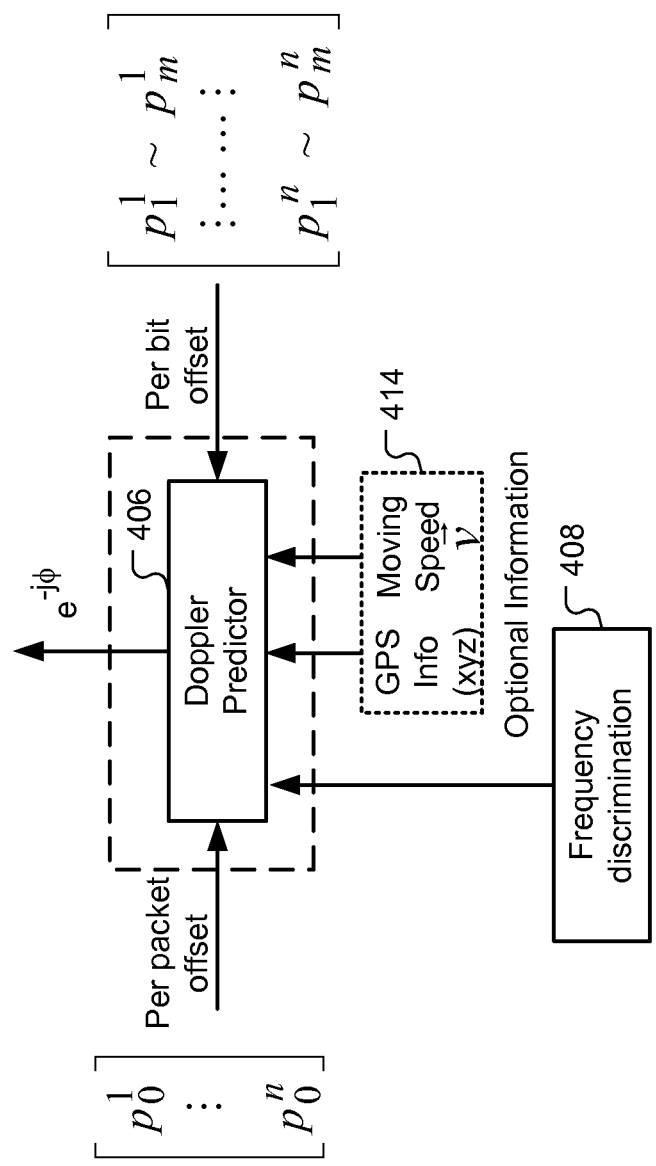
FIG. 11A illustrates an exemplary Doppler predictor interface.
Figure 11B:
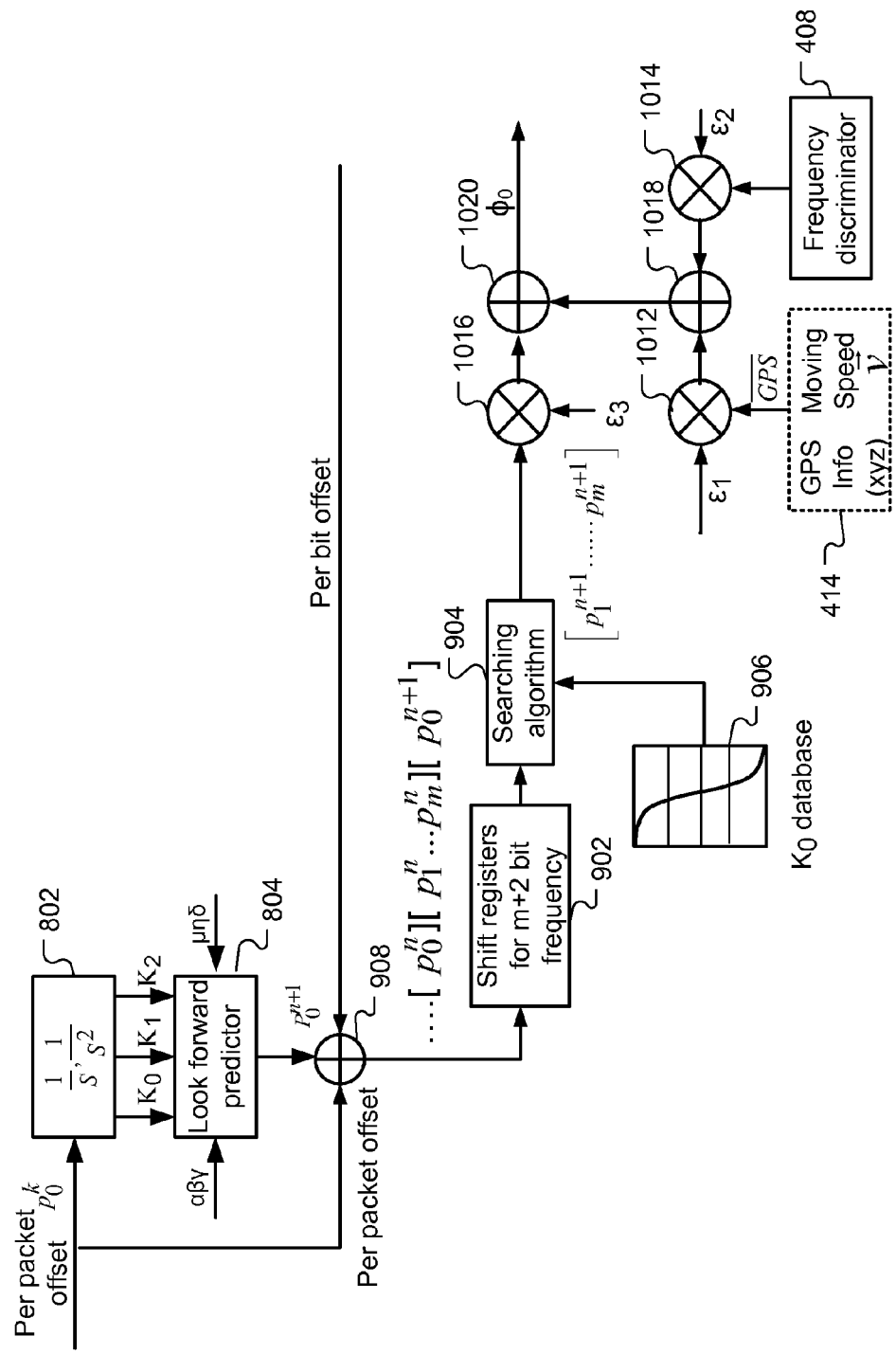
FIG. 11B illustrates an exemplary detailed interconnection between components of Doppler predictor.

FIG. 11A illustrates the Doppler predictor interface. The Doppler predictor accepts per-packet based estimation $P_0^n$, per-bit based estimation $P_m^n$, frequency discrimination based estimation FD, and GPS-based estimation $\overline{GPS}$. FIG. 11B illustrates detailed interconnection between components of Doppler predictor. It can be noted that FIG. 11B comprises circuits in FIG. 8B, FIG. 9B and FIG. 10C.

Figure 12A:
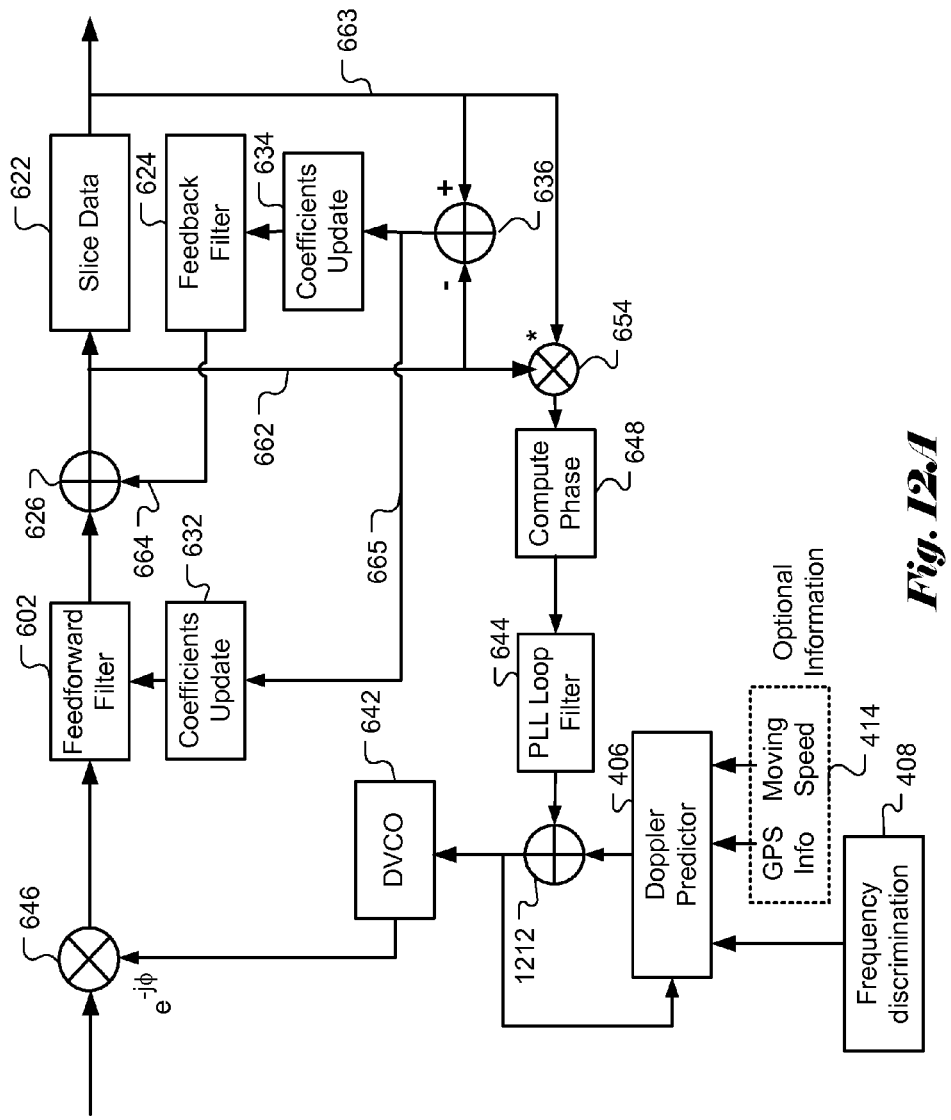
FIG. 12A illustrates an example of incorporating Doppler compensation with the receiver of FIG. 6D.
Figure 12B:
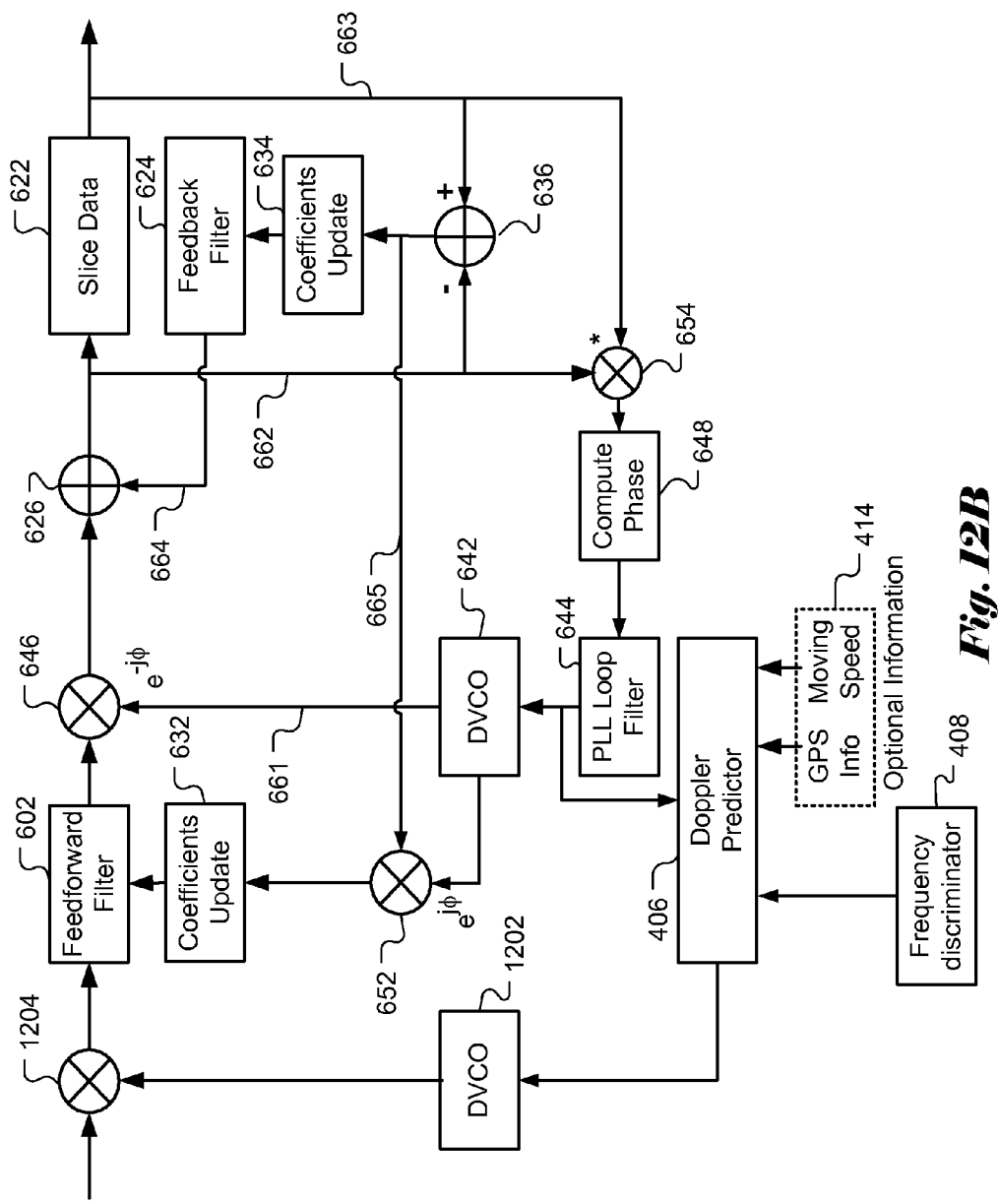
FIG. 12B illustrates an example of incorporating Doppler compensation with the receiver of FIG. 6E.
Figure 12C:
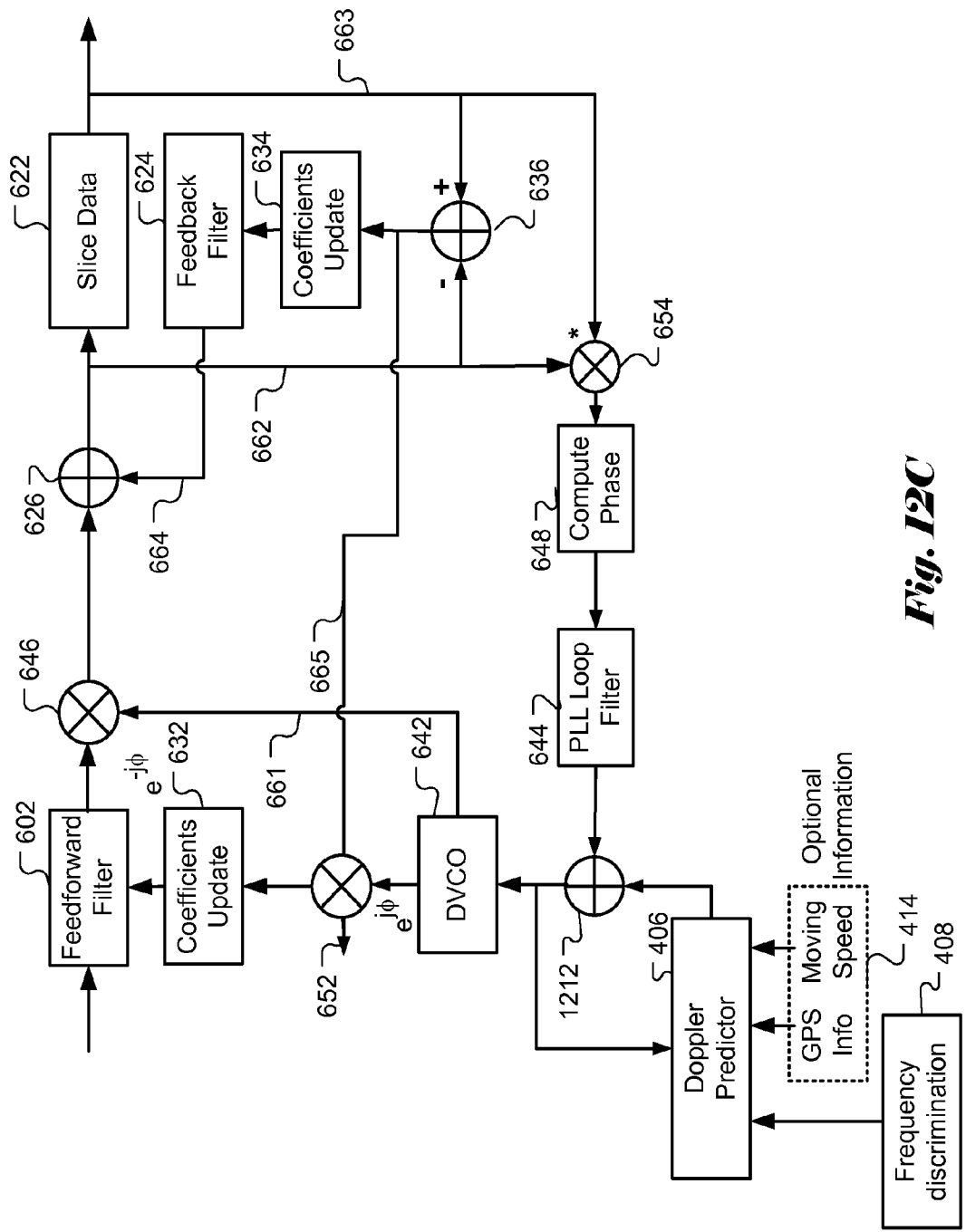
FIG. 12C illustrates another example of incorporating Doppler compensation with the receiver of FIG. 6E.

FIG. 12A illustrates an example of incorporating Doppler compensation with the receiver of FIG. 6D. The Doppler predictor 406 provides the needed control signal to DVCO 1202 to generate a desired frequency offset compensation signal. FIG. 12B illustrates an example of incorporating Doppler compensation with the receiver of FIG. 6E. FIG. 12C illustrates another example of incorporating Doppler compensation with the receiver of FIG. 6E.

According to the above disclosure, the fast Doppler shift within a packet poses a challenging issue for a receiver design. The conventional Doppler shift estimation for a packet using the preamble part of the packet fails in the fast Doppler shift environment. Accordingly, the present invention utilizes a dynamic frequency offset estimation that not only uses the per-packet based estimation, but also uses per-bit based estimation. Furthermore, the present invention utilizes look forward prediction to predict the per-packet frequency offset based on previously derived per-packet frequency offset estimation. The look forward prediction relies on the estimated Doppler shift, the change of estimated Doppler shift and the rate of change of estimated Doppler shift, and form an accurate look forward prediction using a linear weighted function of these three values. The Doppler shift can be estimated based on the received signal. The per-bit based frequency offset estimation relies on the per-packet based estimation and per-bit based estimation for the current packet and the look forward predicted per-packet estimation for the next packet. These data are matched with the profile of Doppler shift corresponding to a fast travelling locomotive at locations around the base station. This method provides an accurate per-bit frequency offset estimation. In addition, the frequency offset estimation may utilize other information such frequency offset estimation based on frequency discriminator or using a GPS. The final Doppler prediction may be based on a combination of the per-packet estimation, per-bit estimation, frequency discrimination based estimation and GPS-based estimation.

The invention may be embodied in other specific forms without departing from its spirit or essential characteristics. The described examples are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method for compensating frequency variation associated with relative motion between a stationary radio terminal and a mobile radio terminal, the method comprising:
receiving a signal associated with a packet, wherein the packet comprises a preamble part and a payload part;
determining a first estimated value of next coarse frequency offset based on a first plurality of coarse frequency offsets, first-order derivatives of the first plurality of coarse frequency offsets, and second-order derivatives of the first plurality of coarse frequency offsets; and
compensating the signal associated with the packet according to the first estimated value.

2. The method of claim 1, wherein the coarse frequency offset is measured based on received signal corresponding to the preamble part.

3. The method of claim 2, wherein the coarse frequency offset is measured based on correlation of the received signal and a pre-defined signal.

4. The method of claim 1, wherein said determining the first estimated value is based on a weighted sum of the first plurality of coarse frequency offsets, the first-order derivatives of the first plurality of coarse frequency offsets, and the second-order derivatives of the first plurality of coarse frequency offsets using weighting factors.

5. The method of claim 4, wherein the weighting factors are related to a first range of the first-order derivatives of the first plurality of coarse frequency offsets and a second range of the second-order derivatives of the first plurality of coarse frequency offsets.

6. The method of claim 1, further comprising:
determining a second estimated value of next fine frequency offset based on a plurality of fine frequency offsets and a second plurality of coarse frequency offsets after said determining the first estimated value; and
compensating the signal associated with the packet according to the second estimated value.

7. The method of claim 6, wherein said compensating the signal associated with the packet according to the second estimated value is applied to the payload part.

8. The method of claim 1, further comprising:
determining a third estimated value of next frequency offset based on speed information of the mobile radio terminal, GPS information of the mobile radio terminal, frequency differentiation, or a combination of two or more members selected from a group consisting of the speed information of the mobile radio terminal, the GPS information of the mobile radio terminal, and the frequency differentiation; and
compensating the signal associated with the packet according to the third estimated value.

9. The method of claim 8, wherein the GPS information is averaged over multiple instances.

10. The method of claim 8, wherein said determining the third estimated value is based on a weighted sum of the speed information of the mobile radio terminal, the GPS information of the mobile radio terminal, and the frequency differentiation using weighting factors.

11. A method for compensating frequency variation associated with relative motion between a radio base station and a locomotive radio terminal, the method comprising:
receiving a signal transmitted between the radio base station and the locomotive radio terminal;
determining an estimated value of frequency offset based on a plurality of previous frequency offsets according to a Doppler shift model, wherein the Doppler shift model is represented by Doppler shift frequency versus a principal distance between the radio base station and the locomotive radio terminal and a location of the locomotive radio terminal for a given locomotive speed; and
compensating the signal according to the estimated value.

12. The method of claim 11, wherein the Doppler shift model is stored in a look-up table.

13. The method of claim 11, wherein said determining the estimated value is based on matching the plurality of previous frequency offsets with the Doppler shift model.

14. The method of claim 13, wherein shift registers are used to store the plurality of previous frequency offsets.

15. A radio communication system comprising:
a stationary radio terminal associated with a base station and a mobile radio terminal associated with a locomotive, wherein at least one of the stationary radio terminal and the mobile radio terminal is operable to:
receive a signal associated with a packet, wherein the packet comprises a preamble part and a payload part;
determine a first estimated value of next coarse frequency offset based on a first plurality of coarse frequency offsets, first-order derivatives of the first plurality of coarse frequency offsets, and second-order derivatives of the first plurality of coarse frequency offsets; and
compensate the signal associated with the packet according to the first estimated value.

16. The radio communication system of claim 15, wherein the coarse frequency offset is measured based on received signal corresponding to the preamble part.

17. The radio communication system of claim 16, wherein the coarse frequency offset is measured based on correlation of the received signal and a pre-defined signal.

18. The system of claim 15, wherein the first estimated value is based on a weighted sum of the first plurality of coarse frequency offsets, the first-order derivatives of the first plurality of coarse frequency offsets, and the second-order derivatives of the first plurality of coarse frequency offsets using weighting factors.

19. The system of claim 18, wherein the weighting factors are related to a first range of the first-order derivatives of the first plurality of coarse frequency offsets and a second range of the second-order derivatives of the first plurality of coarse frequency offsets.

20. The radio communication system of claim 15, is further operable to:
   determine a second estimated value of next fine frequency offset based on a plurality of fine frequency offsets and a second plurality of coarse frequency offsets after said determine the first estimated value; and
   compensate the signal associated with the packet according to the second estimated value.

21. The radio communication system of claim 20, wherein the second estimated value is applied to compensate the payload part of the packet.

22. The radio communication system of claim 15, is further operable to:
   determine a third estimated value of next frequency offset based on speed information of the mobile radio terminal, GPS information of the mobile radio terminal, frequency differentiation, or a combination of two or more members selected from a group consisting of the speed information of the mobile radio terminal, the GPS information of the mobile radio terminal, and the frequency differentiation; and
   compensate the signal associated with the packet according to the third estimated value.

23. The radio communication system of claim 22, wherein the GPS information is averaged over multiple instances.

24. The radio communication system of claim 22, wherein the third estimated value is based on a weighted sum of the speed information of the mobile radio terminal, the GPS information of the mobile radio terminal, and the frequency differentiation using weighting factors.

25. A radio communication system comprising:
   a stationary radio terminal associated with a base station and a mobile radio terminal associated with a locomotive, wherein at least one of the stationary radio terminal and the mobile radio terminal is operable to:
      receive a signal transmitted between the stationary radio terminal and the mobile radio terminal;
      determine an estimated value of frequency offset based on a plurality of previous frequency offsets according to a Doppler shift model, wherein the Doppler shift model is represented by Doppler shift frequency versus a principal distance between the stationary radio terminal and the mobile radio terminal and a location of the mobile radio terminal for a given locomotive speed; and
      compensate the signal according to the estimated value.

26. The radio communication system of claim 25, wherein the Doppler shift model is stored in a look-up table.

27. The radio communication system of claim 25, wherein the estimated value is determined based on matching the plurality of previous frequency offsets with the Doppler shift model.

28. The radio communication system of claim 27, wherein shift registers are used to store the plurality of previous frequency offsets.

* * * * *